United States Patent
Brown et al.

(10) Patent No.: US 10,127,574 B2
(45) Date of Patent: Nov. 13, 2018

(54) INTERNET MARKETING ANALYTICS SYSTEM

(71) Applicants: Cynthia Brown, Denver, CO (US); Ziyi Wang, Fort Collins, CO (US)

(72) Inventors: Cynthia Brown, Denver, CO (US); Ziyi Wang, Fort Collins, CO (US)

(*) Notice: Subject to any disclaimer, the term of this patent is extended or adjusted under 35 U.S.C. 154(b) by 0 days.

(21) Appl. No.: 13/691,564

(22) Filed: Nov. 30, 2012

(65) Prior Publication Data

US 2013/0138503 A1 May 30, 2013

Related U.S. Application Data

(60) Provisional application No. 61/565,479, filed on Nov. 30, 2011.

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0201* (2013.01); *G06Q 30/0202* (2013.01); *G06Q 30/0203* (2013.01); *G06Q 30/0204* (2013.01)

(58) Field of Classification Search
CPC ............... G06Q 30/0247; G06Q 10/04; G06Q 30/0206; G06Q 30/0224; G06Q 30/0255; G06N 5/025
See application file for complete search history.

(56) References Cited

U.S. PATENT DOCUMENTS

| | | | |
|---|---|---|---|
| 7,873,904 B2 | 1/2011 | Wang | |
| 8,099,491 B2 | 1/2012 | Error | |
| 8,131,703 B2 | 3/2012 | Bessieres | |
| 8,209,406 B2 | 6/2012 | Malhotra | |
| 8,301,645 B1 | 10/2012 | Crook | |
| 9,015,632 B2 * | 4/2015 | Toso | G06F 17/30554 715/836 |
| 9,710,815 B2 * | 7/2017 | MacIntyre | G06Q 30/02 |
| 2002/0087679 A1 * | 7/2002 | Pulley | G06Q 30/02 709/224 |
| 2008/0181463 A1 | 7/2008 | Error | |
| 2008/0183745 A1 * | 7/2008 | Cancel et al. | 707/102 |
| 2008/0256444 A1 * | 10/2008 | Wang et al. | 715/700 |

(Continued)

*Primary Examiner* — Fonya M Long
*Assistant Examiner* — Rashida R Shorter
(74) *Attorney, Agent, or Firm* — Lathrop Gage LLP

(57) ABSTRACT

An internet marketing analytics system to quantify visitor website activity, the system including a database having a plurality of parameters having any portion of the following; site visits, total revenue, bounce rate, conversion rate, orders, average order value, value per visit, pages per visit, new visits, units, cart additions, cart removals, internal search, click through rate, revenue per visit, open rate, email list, impressions, visit duration, percent new visitors, percent return visitors, post volume, net promoter score, social referring traffic, total cost, search term, exit rate, page views, and product type, plus non website related visitor internet activity. The system producing a multi-variate visual spatial display of the database including at least three parameters being simultaneously displayed and modifying the display to selectively emphasize a parameter to be displayed as an X, Y, or Z axis for clarity, for modifying a component of the database to optimize website efficiency.

21 Claims, 30 Drawing Sheets

(56) References Cited

U.S. PATENT DOCUMENTS

2013/0125057 A1* 5/2013 Kashik ............... G06F 3/04815
                                                    715/852
2017/0092008 A1* 3/2017 Djorgovski .......... G06T 19/006
2017/0193688 A1* 7/2017 Djorgovski .......... G06T 15/205

* cited by examiner

All Traffic Sources   1-Jul-11 thru 31-Jul-11

| Source/Medium | Visits | Revenue | Bounce Rate | Conversion Rate | Orders | Average Order Value | Revenue Per Visit | Pages Per Visit | % New Visits |
|---|---|---|---|---|---|---|---|---|---|
| google/organic | 75,092 | $217,543.20 | 28.59% | 0.72% | 544 | $399.90 | $2.90 | 6.62 | 57.04% |
| (direct)/(none) | 65,487 | $201,647.71 | 42.68% | 0.76% | 497 | $405.73 | $3.08 | 5.58 | 61.22% |
| google/cpc | 47,642 | $210,086.30 | 15.76% | 1.04% | 497 | $422.71 | $4.41 | 7.27 | 60.82% |
| SilverpopMailing/email | 41,151 | $150,243.91 | 37.76% | 0.86% | 352 | $426.83 | $3.65 | 5.24 | 27.41% |
| bing/organic | 5,938 | $19,606.25 | 25.67% | 0.79% | 47 | $417.15 | $3.30 | 6.77 | 52.32% |
| facebook.com/referral | 5,145 | $3,730.47 | 52.67% | 0.23% | 12 | $310.87 | $0.73 | 4.10 | 46.81% |
| twitter.com/referral | 1,822 | $143.50 | 65.15% | 0.05% | 1 | $143.50 | $0.08 | 2.67 | 56.53% |
| stylebop.com/referral | 942 | $2,956.16 | 24.10% | 1.06% | 10 | $295.62 | $3.14 | 6.54 | 35.35% |
| aol/organic | 697 | $3,443.00 | 17.79% | 1.43% | 10 | $344.30 | $4.94 | 8.26 | 70.30% |

Fig. 1

On-Site Search Terms — Prior Month

| Internal Search Terms | Revenue | Orders | Units | Cart Additions | Cart Removals | Visits |
|---|---|---|---|---|---|---|
| sale | $5,417 | 34 | 34 | 160 | 7 | 921 |
| hobo | $2,588 | 7 | 7 | 10 | 0 | 26 |
| sweater | $2,389 | 14 | 15 | 50 | 0 | 183 |
| shoes | $2,285 | 12 | 12 | 71 | 4 | 972 |
| boots | $2,255 | 13 | 13 | 68 | 3 | 1,323 |
| sandals | $1,731 | 12 | 12 | 37 | 0 | 157 |
| flip flop | $1,660 | 28 | 33 | 65 | 2 | 133 |

| Internal Search | Click Thrus | Conversion Rate | Revenue per Visit | Checkouts |
|---|---|---|---|---|
| 923 | 18 | 1.40% | $5.87 | 58 |
| 26 | 0 | 24.14% | $89.22 | 10 |
| 184 | 0 | 3.00% | $5.13 | 30 |
| 977 | 21 | 0.43% | $2.34 | 32 |
| 1,334 | 127 | 0.64% | $1.69 | 27 |
| 161 | 1 | 3.01% | $4.34 | 18 |
| 142 | 2 | 7.27% | $4.31 | 45 |

Fig. 6

On-Site Search Terms — Following Month

| Internal Search Terms | Revenue | Orders | Units | Cart Additions | Cart Removals | Visits |
|---|---|---|---|---|---|---|
| shoes | $6,937 | 24 | 25 | 136 | 2 | 1,556 |
| sale | $3,160 | 23 | 25 | 160 | 2 | 1,038 |
| sandals | $2,030 | 12 | 12 | 31 | 1 | 263 |
| flip flop | $1,437 | 29 | 29 | 64 | 1 | 210 |
| hobo | $1,152 | 3 | 3 | 8 | 0 | 52 |
| boots | $3,626 | 4 | 4 | 31 | 2 | 663 |
| sweater | $547 | 2 | 2 | 3 | 0 | 32 |

| Internal Search | Click Thrus | Conversion Rate | Revenue per Visit | Checkouts |
|---|---|---|---|---|
| 1,577 | 52 | 3.54% | $0.99 | 42 |
| 1,053 | 17 | 2.26% | $1.21 | 48 |
| 274 | 8 | 4.62% | $2.85 | 15 |
| 215 | 7 | 14.80% | $2.86 | 40 |
| 51 | 5 | 6.12% | $11.88 | 6 |
| 663 | 61 | 3.61% | $0.64 | 18 |
| 32 | 1 | 6.45% | $7.93 | 3 |

Fig. 8

INTERNET MARKETING ANALYTICS SYSTEM

RELATED PATENT APPLICATIONS

This application claims the benefit of U.S. provisional patent application Ser. No. 61/565,479 filed on Nov. 30, 2011 by Cynthia Brown of Denver, Colo., U.S. and Ziyi Wang of Fort Collins, Colo., US.

FIELD OF THE INVENTION

The present invention generally relates to internet based marketing analytics systems for the gathering together of information from customer website use that is grouped by various criteria that can prove useful to a business owner to better understand their customers and optimize the business owner's website and marketing efforts. More particularly, the present invention presents a multi-media three or more dimensional information display delivery system to give the business owner a more complete impression of their customers multitude of activities in an interactive manner from the business owner website, in where a potential customer is coming from, where they go on the business website, how long they stay, their returns, conversions to sales, exit rates, and the like to enable business website design modifications, keyword changes, social media adjustments, email, blog, and other promotional logistics changes to make the business owner's website perform better in the form of a higher efficiency for the business to generate more sales revenue from their website, also in higher usability to customers and improve website performance statistics in the number of visits, conversions, navigation, sales, and the like.

DESCRIPTION OF THE RELATED ART

As today's competitive on-line market place continues to become more predominant player in the goods and services commerce area, wherein it is estimated 93% of all purchase decisions originate with an on-line search, thus making on-line search a paramount factor to know and understand better in relation to how a company's website performs in generating, retaining, and resulting in purchase decisions by customers. The amount of data that must be analyzed by digital marketers is voluminous and continuously increasing. Such data is found across multiple digital campaign systems and is presented in raw numbers, table data, or graphical form. It is very hard for digital marketing specialists, analysts, managers, and executives to understand the impact of the interactive nature of the data. Further complicating the challenge, on-line digital campaigns have multiple data points that need to be reviewed simultaneously to gather insights and determine correct actions that need to be taken based upon potentially numerous data interactions that take place in a dynamic manner.

In looking at the prior art, and U.S. Pat. No. 7,873,904 to Wang et al., disclosed is an Internet visualization and related user interface system wherein Wang analyzes Internet search logs to determine the most popular search queries worldwide for a specified time period. In Wang, a user interface displays a keyword for each of the most popular queries in a single visual display that relates each query to a geographical location of the highest popularity, with the system having filters available for various demographics. Further, in Wang in one implementation the user interface provides for a three-dimensional Internet visualization that can further adopt an artistic visual theme such as ocean or seascapes. The patentability in Wang resides in displaying a set of the most popular Internet queries on a user interface with a three-dimensional visualization and wherein the three-dimensional visualization is configured to show relationships between the location associated with the popular query, the relative magnitude of the popularity of each query, the changes in the popularity of each query over time, and the changes in the set of the most popular queries over time. The Internet queries in Wang include ones with geographic origins, demographics most popular queries for a given geographical region that can include gender, age, nationality, organization, interest, income, profession, hobbies, and shopping habits, and the clicked on links associated with each query. What Wang does not teach is any definitive analysis and improvement suggestions of the group of Internet queries that could result in optimizing or increasing the efficiency of website activity performance, such as increasing website revenue.

Continuing in the prior art, in United States patent application publication number 2008/0181463 to Error disclosed is a system that uses color for a website analysis report. Wherein in Error, the website analysis report shows paths between nodes with color being used to indicate the direction of traffic that follows a particular node to node path; further different colors are assigned to different nodes in the website analysis report. Thus in Error the report is color-coordinated according to their destination nodes so as to provide a distinctive visual identification of any traffic flow direction, also node connection direction can be reinforced by static and moving arrows. Error also discusses the use of multiple colors and variances of color intensity, and the use of animation to further indicate the direction of traffic between the first node in the second node. Error does not disclose any analytical suggestions for the result of effectuating change in node to node performance.

Further in the prior art, in U.S. Pat. No. 8,099,491 also to Error, disclosed is a website analysis report that utilizes intelligent node positioning for a showing of the paths between nodes that are automatically positioned within the report in an intelligent manner, according to specific criterion to provide useful information about the represented website pages. For example in Error, the Y-axis can indicate relative depth of the page in the site, while the X axis represents conversion rate, alternatively node positioning can represent any other quantitatively representable data values, either as a default or selected by the user, thus resulting in the depiction of a direct relationship between the page depth and the user behavior associated with each node. The qualitative values in Error can represent the average number of website pages that users visit prior to visiting a page corresponding to a particular node, the qualitative values can also represent user behavior associated with the node which could include as an example conversion rates. Error also teaches visitation patterns between the note connections and has the ability to allow the user to adjust or change at least one of the established positions, however, this user initiated change does not provide any additional analysis or showing any additional information on the interactive relationships between nodes, as the user initiated changing of the established positions is simply a physical repositioning of the node to node data to allow the user to selectively un-crowd the display screen only.

Next in the prior art, in U.S. Pat. No. 8,131,703 to Bessieres et al., disclosed is a analytics-based generation of ordered lists, search engine fee data, and site map's, that include generating ordered search results based upon dynamic web analytics data that allows the resulting list of records that is responsive to a query to be ranked in a way that improves user satisfaction and conversion success rate. Further in Bessieres the system interrogates a target website to build a database of products and services, wherein in the individual pages and products offered on the pages are ranked based upon the analytics data. Bessieres results are in responses to searches of the target website and has a list of records that reflect the analytics data, which improves the ordering of the list of records based on the criteria such as webpage popularity, product popularity, or conversion success rate. Also, in Bessieres is the generation of appropriately ordered search engine feed data based upon the rank database of products for the target website as well as the generation of search engine site maps with a corresponding priority attribute based on the analytics data. Bessieres utilizes a collection of website browsing analytics data that includes historical data indicative of prior interactions of a number of users with the multitude of webpages on a target website this results in determining a rank for each one of the webpages of the target website such that the ranking is based at least in part on prior interactions of the plurality of users with one or more of the plurality of webpages of the target website. However, Bessieres is merely indicative of prior website performance but has no teaching relative to the improvement of website performance parameters.

Moving forward in the prior art, in U.S. Pat. No. 8,209,406 to Malhotra et al., disclosed is a system and method for the assessment of click or traffic quality on a website that includes displaying of an indication of traffic quality, wherein the system retrieves keyword or other traffic data for at least one keyword associated with at least one search engine, then the system compares the traffic data for a first time period to the traffic data for a second time period, according to date ranges or other parameters selected by a user. Thus, in Malhotra as a result of this first and second time period comparison being an indication of the traffic quality associated with a disparity between the two time periods is displayed, with the bottom-line result of attempting to determine whether click fraud has occurred. However, in Malhotra there is no expert system inherent intelligence in the program and has a requirement for user-specified thresholds comprising values for each of the website activity performance metrics with the program merely determining disparities between these website activity performance metrics to identify potential click fraud based upon the user-specified values wherein these values are subsequently displayed on a computer. Thus, in Malhotra there is no teaching of a program inherently determining potential click fraud as the program distinctively relies on user-specified thresholds of the website activity performance metrics for the identification of potential click fraud.

Also, in the prior art in U.S. Pat. No. 8,301,645 to Crook disclosed is a system and method for aggregated web analytics requests that include receiving a file from the network site, wherein the file has display information for one or more content items, and parsing the file to display the one or more content items. The parsing in Crook includes in the file request to transmit the analytics data to a remote analytics site, having transmission of the analytics data to wait for encountering subsequent requests in the file, once a subsequent request has been made, the analytics data is aggregated and sent to the remote analytics site as a grouping. The patentability in Crook rests upon this bundling of requests to transmit analytics data to a remote analytics site, wherein this transmission of data to the remote analytics site is delayed to wait for incorporating subsequent requests in the file. There is no teaching in Crook of any actual program directed web analytics data analysis for the purpose of optimizing or increasing the efficiency of a particular website.

The present invention is for a system, method, and apparatus for conveying multi-dimensional, multi-channel digital marketing data to result in an optimization or efficiency increase of a company's on-line activities. Data is extracted from any platform or system which could be Pay-Per-Click Search platforms, email marketing service provider platforms, ad-serving platforms, social media platforms, web analytics systems, CRM systems, order systems, or any other system that would have digital marketing or ecommerce data.

SUMMARY OF INVENTION

Broadly, the present invention is of an internet marketing analytics system for use by an analyst to quantify a visitor's web activity related to a website of interest, the system including a database having a plurality of parameters that can include any portion of the following; site visits, total revenue, bounce rate, conversion rate, orders, average order value, value per visit, pages per visit, new visits, units, cart additions, cart removals, internal search, click through rate, revenue per visit, open rate, email list, impressions, visit duration, percent new visitors, percent return visitors, conversion path, post volume, net promoter score (NPS), social referring traffic, total cost, search term, exit rate, page views, and product type, plus any other internet activity parameters. The internet marketing analytics system also includes one or more processors, memory, and one or more programs, wherein the one or more programs are stored in the memory and configured to be executed by the one or more processors. The one or more programs including instructions for producing a multi-variate visual spatial display of the database including at least three of the parameters being simultaneously displayed and further instructions for dynamically modifying the display to selectively emphasize one of the parameters to be displayed as an X, Y, or Z axis for clarity, resulting in a decision to be made for altering a feed component into the database to monitor an effect of the altering upon the display to ultimately optimize the website's performance.

The ultimate goal of the present invention is to provide a web analytics system that can provide insight and identify what actions need to be taken to optimize and make more efficient the website of interest, that usually results in four goals either individually or in combination, being firstly to increase revenue, secondly to drive more traffic to the website (by increasing leads), thirdly to improve customer loyalty and satisfaction, and forth to reduce cost.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 1 shows a table of the top nine website traffic sources and an array of associated data;

FIG. 6 shows an on-site search data table;

FIG. 8 shows the FIG. 6 data after improvement adjustment in the search terms "boots" and "shoes";

DEFINITIONS

Figure 2:
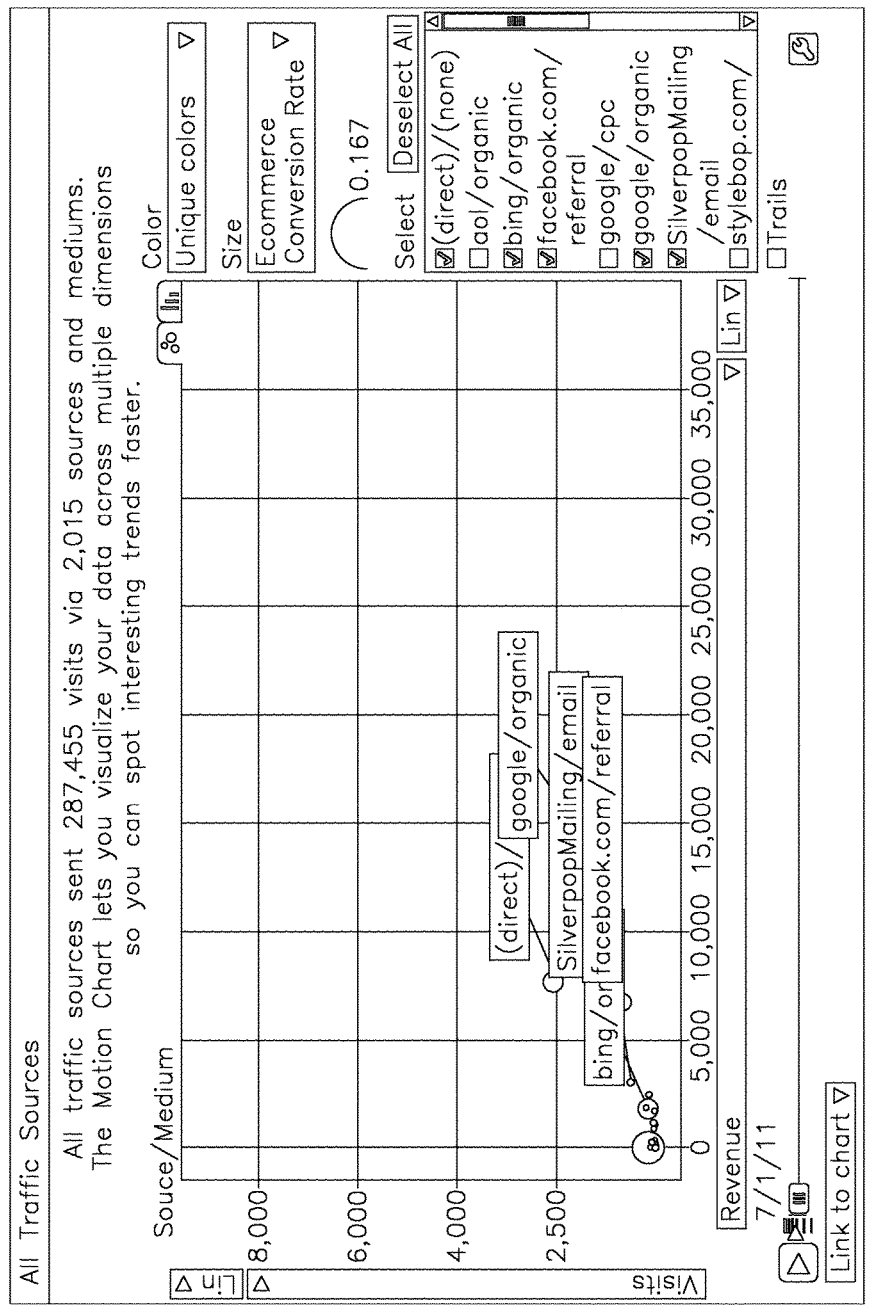
FIG. 2 shows the FIG. 1 data in a two dimensional graphic format with visits versus revenue.

A/B testing=or as termed split testing compares the effectiveness two different versions of a particular website page for purposes of discovering the better response of each of the different web pages performance measures such as in sales conversion rates, exit rates, and the like.

Bounce rate=When a website visitor exits the website from the same page they entered, without navigating to, or interacting with, any content on the site, it is defined as a bounce. The bounce rate is a calculation of bounces to visits within a given time period and can be measured at the website or webpage level.

Brand name search descriptors=Search terms that directly identify the product of interest brand name, such as AMERICAN EAGLE for example.

Click through rate (CTR)=is defined as the number of clicks on an ad or a link, divided by the number of impressions or times the item was shown.

Conversion path=the number of steps as though a path that the website visitor goes through from their initial internet entry web page to their final destination web page.

Conversion rate=is the percentage of website visitors that complete one or more tracked actions on a website, divided by the total number of visits within a given time period. Conversions are defined differently and can include: items purchased from the site using a checkout process; email signups, content read or delivered, and lead generation, for example.

Cost per click (CPC)=used with paid on-line search wherein an advertiser selectively sets the amount they will pay for a potential customer to "click through" their on-line banner or other ad, wherein the click takes the potential customer directly to the advertiser's website, the amount that the advertiser pays-per-click determines their rank (the higher the rank the higher the amount) position within a group of competitor ads that are displayed from a particular on-line search term that the potential customer initiated.

Data clusters=a group of data points that are plotted on a display that are closely grouped together.

Data outliers=a single data point that when plotted on a display stands alone being significantly separated from the other data points.

Destination search descriptors=Search terms that are geographically oriented and can be used in combination with brand name search descriptors and/or generic search descriptors, such as "Chicago" used with "AMERICAN EAGLE" for example to find American Eagle stores within the Chicago area.

Direct traffic channel=the amount of on-line potential customer activity originating from the Direct traffic source Direct traffic source=wherein an on-line potential customer directly enters the business website address to specifically go to the businesses website, or accesses the website via previously saved bookmark.

Email list=a business's list of customers and potential customers who have had some type of previous contact with the business to enable them to sign up for the email list—either by signing up on-line or in person while at the business's premises, this list is used to communicate special product offerings, sales, and the like.

Exit rate=A calculated metric which tracks which webpage was the last viewed in a visitors online session, and from which the user exited. The exit rate is calculated by dividing the number of times the page was the exit page by the total page views for that page within a given time frame.

Generic search descriptors=search terms that describe products by category for instance (with no attachment to a geographic term or a product brand name), such as shirts, pants, shoes, compare to brand name search descriptors and destination search descriptors.

Net promoter score (NPS)=basically divides customer into three groups, first—the "promoters" who are highly satisfied and loyal customers who encourage others to do business with a particular company, second the "passives" who are basically satisfied customers, but can be easily convinced to move to the competition, and third the "detractors" who are unhappy customers that will take their business elsewhere at the first opportunity. The NPS equals the "promoters" minus the "detractors" in percentages, thus a well performing and growing company will have a NPS score that is greater than two times the average company in a given industry, thus the bottom line is that to have a positive NPS score as the "promoters" must outnumber the "detractors", plus by a substantial amount, wherein an average company may only be at an NPS of 5 to 10 percent and a high performing company would be at 50 to 80 percent for their NPS.

Number of impressions=when an advertiser posts an ad on-line such as either a banner type or postage stamp type, it is the number of exposures (views) by potential customer who is searching on-line, thus an on-line ad can have a large number of impressions but a small number click throughs on that same ad.

Number of page views=the number of exposures that a particular website page gets from viewing customers, this can be broken down as a total or per potential customer, and over various time periods.

On site search=this is a search engine that uses keywords and phrases typed into a search bar by website users. This search is limited to the content within a particular website and only displays search results that are found within the website, as compared to GOOGLE search that encompasses the entire internet, resulting in on-site search being more specific and focused by the potential customer.

Open rate=the percentage of email recipients of a mailing of a particular message who actually open it and (presumably) read it.

Organic traffic channel=the amount of on-line potential customer activity originating from the organic traffic source.

Organic traffic source=search results from a potential on-line customer that are generically derived from overall internet search terms—not being from a specific paid for on-line ad.

Pages per visit=other way of tracking the amount of time that a customer spends on a particular website via how many pages of the website are viewed during a single session on the website. Calculated by dividing the total number of page views by the total number of visits in a given time period.

Percent new visitors=potential on-line customers who are visiting a particular website for the first time as a proportion of total potential online customers who are visiting the particular website for a given time period.

Percent return visitors=potential on-line customers who are visiting a particular website for the second time or more as a proportion of total potential online customers who are visiting the particular website.

Posting volume=the secondary activity based upon an on-line entry-such as a comment on a blog post, or a "like" on a posting, and similar follow on posts based on an initial posting.

Revenue=sales dollars generated through online sales-principally through what is termed "shopping carts" or "check outs" where goods and services are purchased on-line, this can be broken down in numerous ways via type of products wherein the number of individual orders are counted, by purchaser, by purchaser website visit, and the like.

Shopping cart additions=the count of times a potential online customer adding goods or services to the first step in a series of steps which result in a purchase, in a given time period. May also be referred to as shopping bag additions. These additional statistics are looked at for the website customer's buying behavior, resulting in when and how products are added to the customers shopping cart.

Shopping cart checkouts=further to the above statistics are looked at for when and from where the customer enters the shopping cart and if the customer enters into the steps required to complete a purchase.

Shopping cart removals=also removals of products already placed into a shopping cart by a customer as to the when and how.

Social referring traffic=the originating on-line source for the website visitor, as an example FACEBOOK, TWITTER, blogs, portal websites (both specialized and general), NEWYORKTIMES, AOL, FASHIONISTA, WIKIPEDIA, directories, news sites, and the like.

Visits=is defined as the series of page requests beginning at the time a user accesses a website to the time they exit the website. A visit is considered ended when no page requests or actions have been logged in a given timeframe, generally 30-minutes. Session timeout can be set by the website unique to each circumstance.

Visit duration=the actual time spent on a particular website by either a unique individual or totaled by multiple individuals on specific website pages, and numerous other ways, in going with the conventional wisdom that the more time an individual spends on the website the better it is.

REFERENCE NUMBERS IN DRAWINGS

50 Internet marketing analytics system
55 Internet marketing analytics remote access apparatus
60 Method for producing internet marketing analytics derivative information
65 Internet market analytics product for use with a computer
70 Internet marketing analytics computer data signal
75 Carrier wave
80 Internet marketing analytics memory for storing data
85 Analyst
90 Visitors which may include users, viewers, potential website 105 customers, and website 105 customers
95 Internet activity level of the visitor 90
100 Internet activity database including a plurality of parameters
101 Select time period of database 100

105 Website
110 Computer usable medium
115 Processor
120 Memory
125 Programs including instructions
130 Multi variate spatial display
135 At least three parameters being simultaneously displayed on the display 130
140 At least eight parameters being simultaneously displayed on the display 130
145 Altering a viewing position of an X, Y, or Z axis of the display 130
150 Abnormal groupings of database parameters 100
155 Clusters of abnormal groupings 150
160 Outliers of abnormal groupings 150
165 Gaps of abnormal groupings 150
170 Plurality of different colors on the display 130
175 Plurality of different text sizes on the display 130
176 Plurality of different surface textures on the display 130
180 Plurality of different geometric feature sizes on the display 130
185 Local host interface component
190 Local human perceptible interface device
195 Local control module
200 Remote host server computer
205 Connection or data communication structure between local host interface component 185 and remote host server computer 200
210 Data interaction from the local human perceptible interface device 190 input to the input on the remote host server computer 200
215 Data interaction output from the remote host server computer 200 to the local human perceptible interface device 190 output

DETAILED DESCRIPTION

The website source database parameter data is input into the program. The data can be raw data or composite data (i.e. data derived from raw data and principal components of multiple data attributes). The business end user then selects multiple data attributes over a selected time period that they want displayed in a three or more-dimensional cube. The multi-dimensional cube can then be rotated, viewed from different angles, zoomed for closer inspections, and panned to look at different data segments interactive relationships. This helps the user identify extreme data points, data outliers, and data clusters, and data gaps, to gain insights and identify actions to improve digital marketing performance or efficiency.

As an example the three-dimensional cube display has three axes. Each axis can be represented by a raw data attribute such as page views, bounce rate, revenue, or composite data such as data derived from raw data in multiple analysis, e.g. principal component analysis. In the display cube, the data is represented as a dot. The dot can have three characteristics of size, color (line hashing codes in the patent application Figures), a label, and varying size/color that represents additional data attributes. Examples on the benefits and impacts of displaying data in a three-dimensional cube are shown which also can be more than three-dimensional.

In referring to FIG. 1, as an example the top nine traffic sources are displayed in a data table for a specific time period, while there are nine data attributes per traffic source, the user cannot quickly get insights into what the top performing channels are when you consider all data attributes, in other words gaining a sense of the interactive relationships of the data attributes to one another is not at all obvious. For example in FIG. 1, the direct traffic source (visitors who type in the domain name and go directly to the site from their browser) is second in visits and revenue, while this looks good, the third attribute being the bounce rate is extremely high (42.68% of all visitors went to the home page and left immediately) and the conversion rate, the fourth attribute is very low at 0.76%. Thus as FIG. 1 shows the direct traffic performance when considering the first four attributes (being visits, revenue, bounce rate, and conversion rate) at one time indicates that there is a problem with the direct traffic channel (being the second channel) and it needs optimizing, resulting in this not easy to see from the table in FIG. 1. Next, in looking at FIG. 2, we look at the same data as in FIG. 1, but in a two-dimensional chart of number of visits versus revenue only. In FIG. 2, at first glance the direct traffic channel looks like it is performing the best, wherein the label is hiding the Google Organic traffic dot; this is very misleading in that other parameters are not considered.

Figure 3:
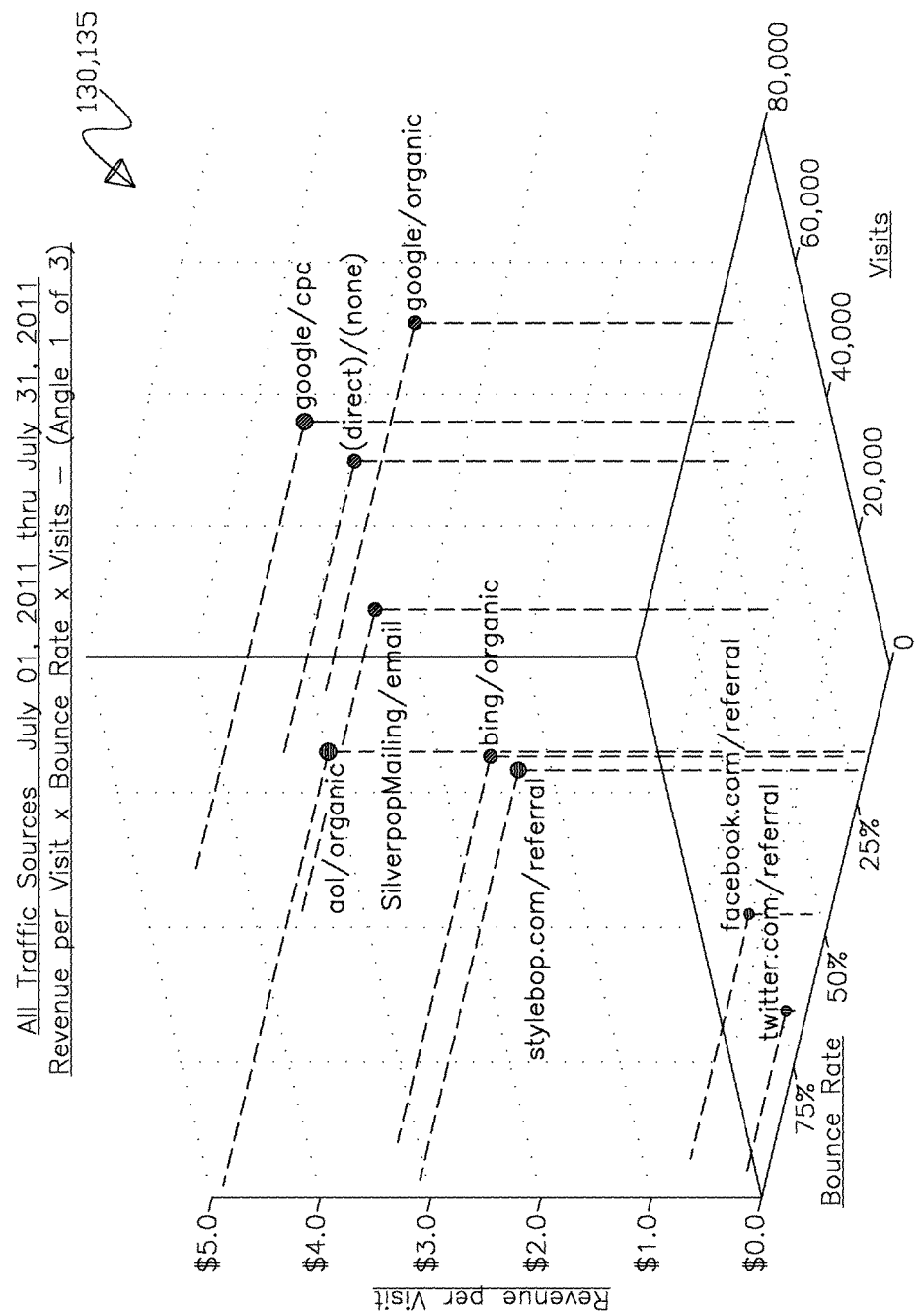
FIG. 3 shows the FIG. 1 data in the three dimensional visual cube format display.
Figure 4:
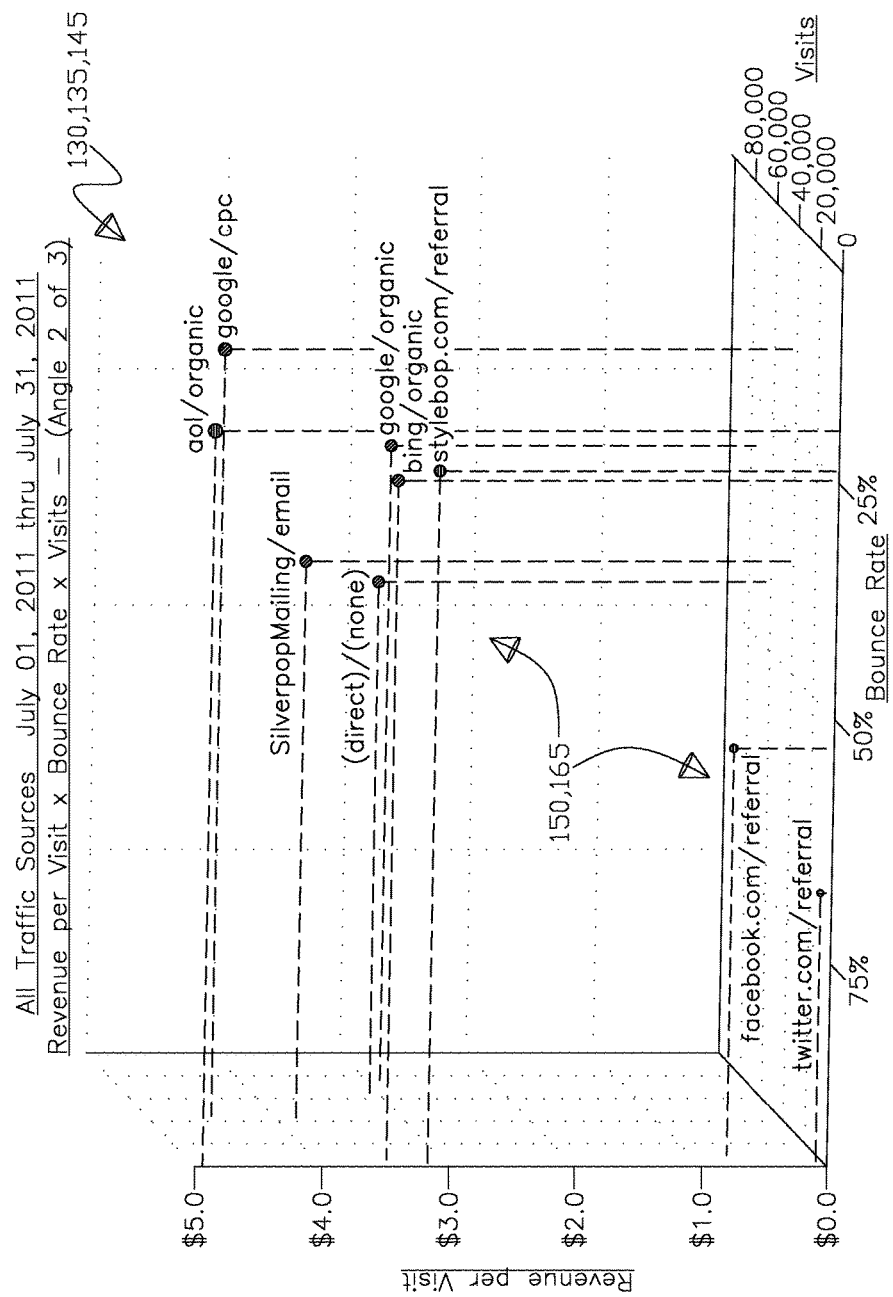
FIG. 4 is a rotation of FIG. 3 to bring the bounce rate axis into better view.
Figure 5:
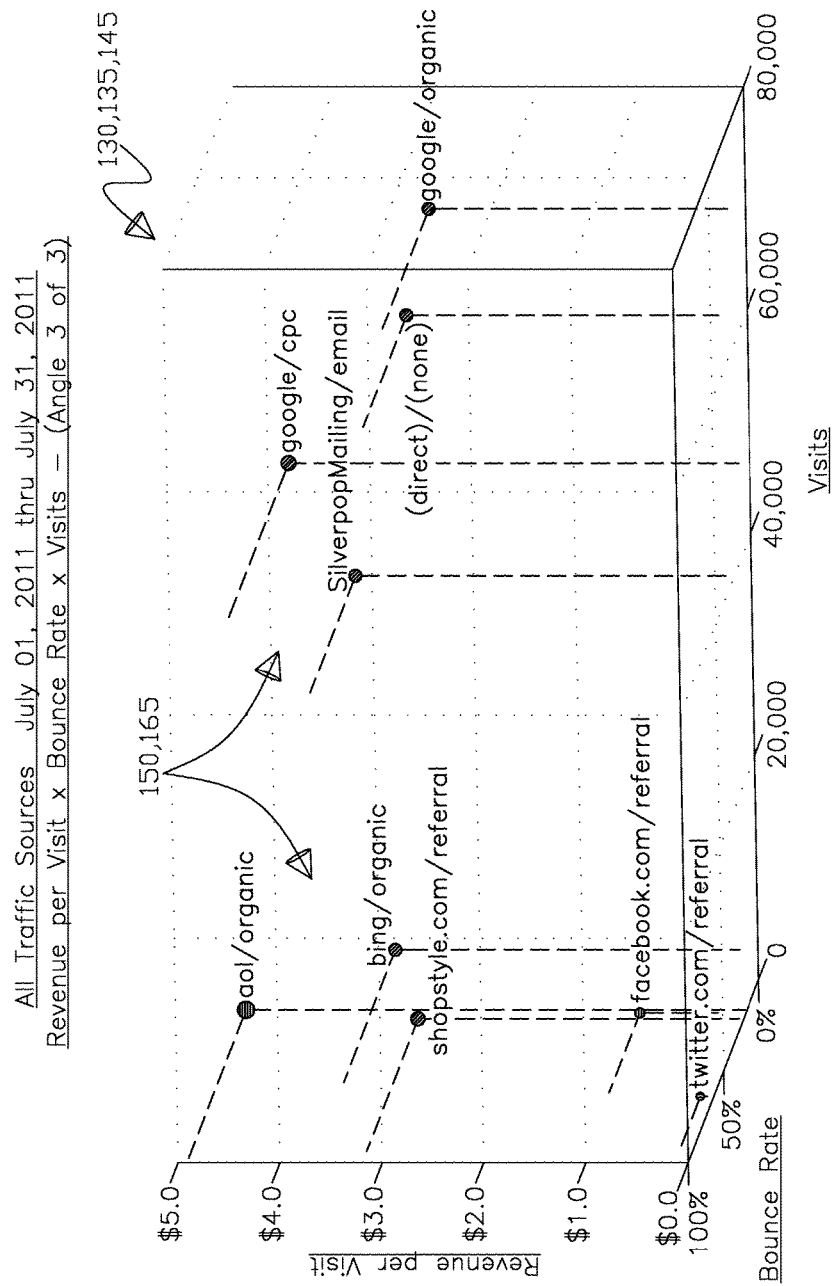
FIG. 5 is a further rotation of FIG. 4 to bring the visits axis into better view.

Further, in referring to FIG. 3, which is a three-dimensional display cube of the example data shown in FIG. 1, the direct traffic channel has a green dot (angled hash marks) indicating that it is in the top ⅓ of all revenue channels. Also in FIG. 3, we also quickly see that the direct channel is not performing as well as Google cost per click (CPC), Silverpop mailing email, or even AOL organic channels in terms of revenue per visit. Continuing in FIG. 4, when we rotate the FIG. 3 display cube and get a better look at the bounce rate, we see that the direct channel has the highest bounce rate amongst the top ⅓ revenue channels (it is the green dot farthest to the left on the Y axis or in the application the angled hash lines), this is very concerning and the optimizing logic should recommend enhancements to the website home page to improve (lower) the bounce rate. Looking to FIG. 5, which is a further rotation of the FIG. 4 display cube, shown is the number of visits parameter is displayed on the X axis for clarity, showing that in the top ⅓ revenue channels, the highest revenue per visit is for the lower number of visits channels, indicating better quality or more buying motivated customer visitors.

Figure 7:
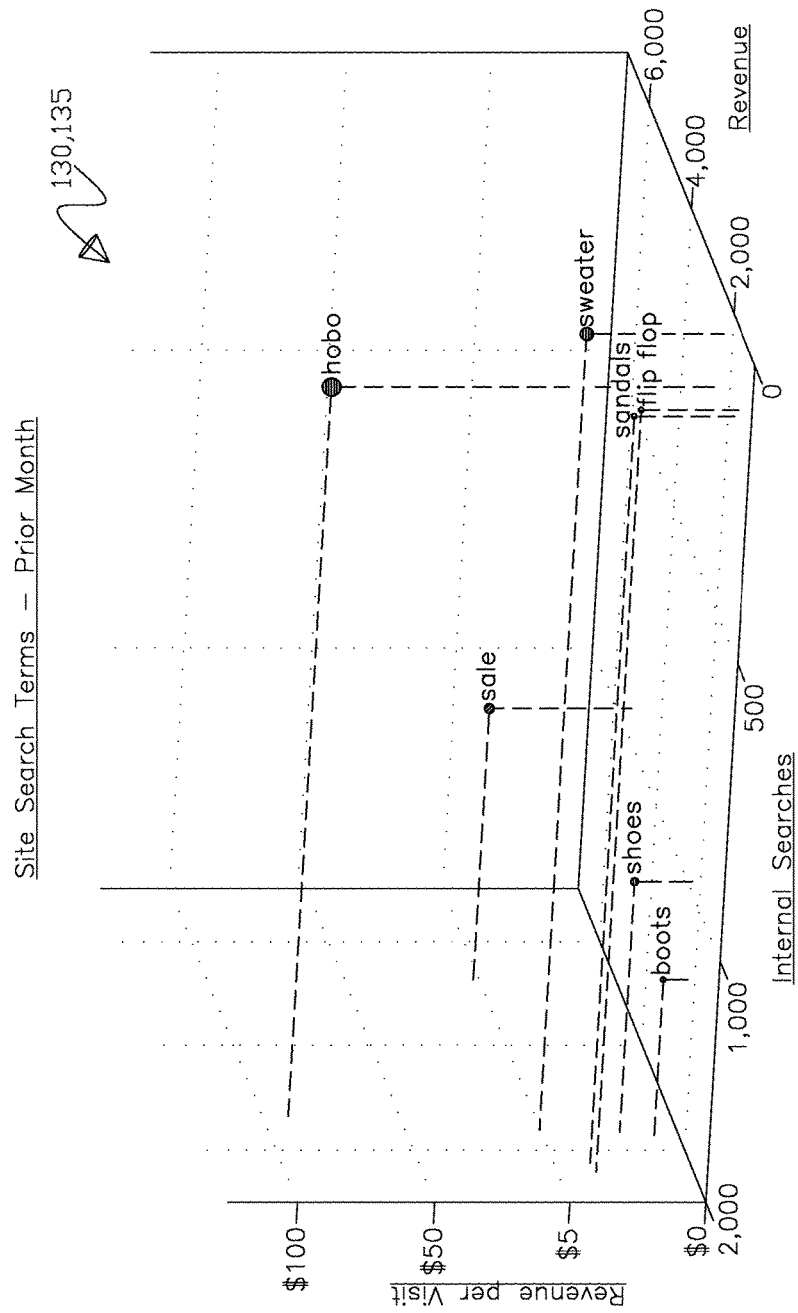
FIG. 7 shows the FIG. 6 data in the three dimensional visual cube format display.
Figure 9:
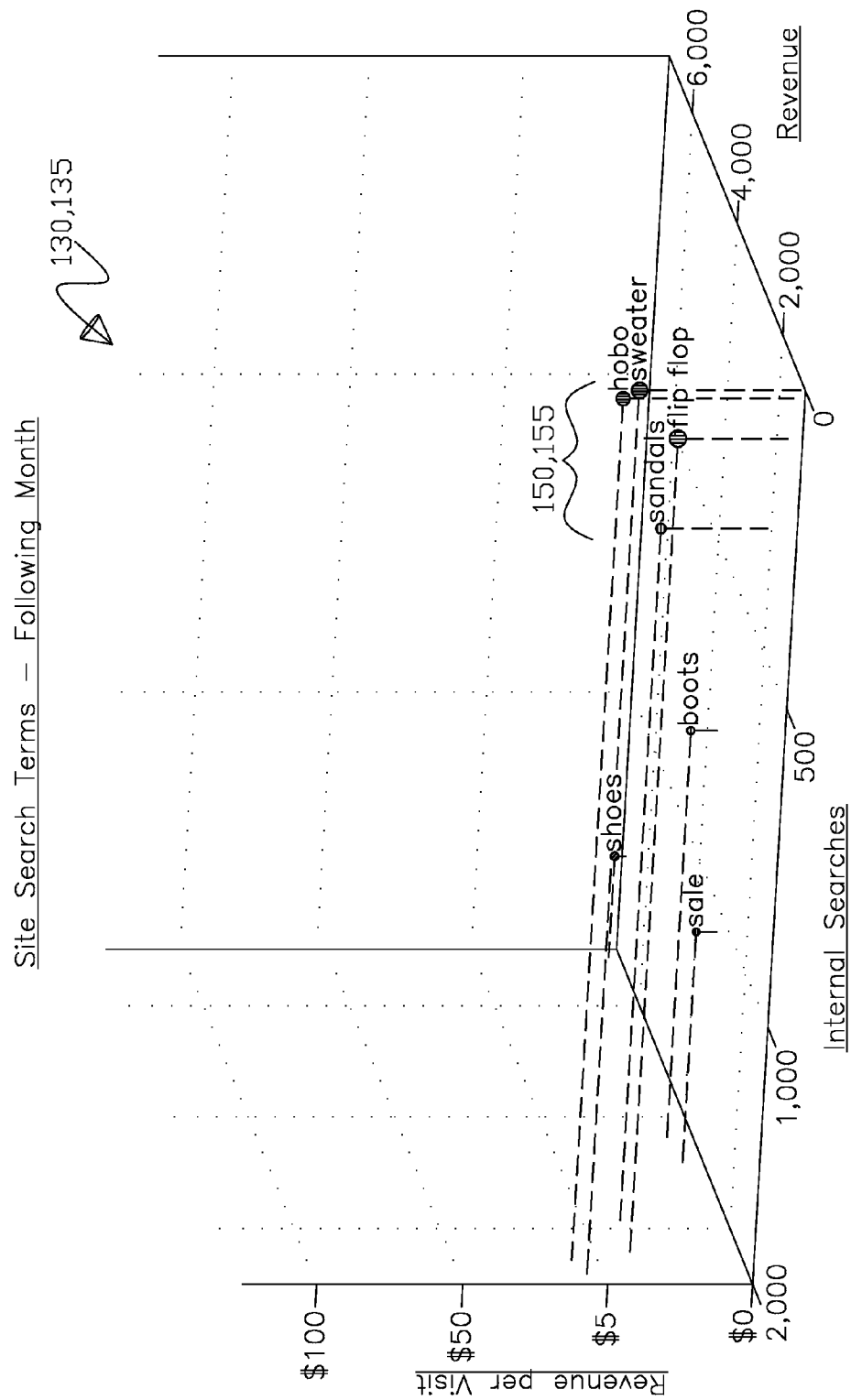
FIG. 9 shows the FIG. 8 data in the three dimensional visual cube format display.

Next, in FIG. 6 shown is on-site search that is one of the most used features of an ecommerce website and it is also one of the most important features because the visitor is telling the website exactly what they want in the form of the visitor on-site website search history, i.e. it is the 'voice of the visitor-customer'. The FIG. 6 table is a portion of a standard on-site website search report from OMNITURE, who is an online web analytics company, wherein it displays what the top performing search terms are for a specific time period. From this report in FIG. 6, it looks like the terms "shoes" and "boots" are doing well based upon the high number of website visits and are both in the higher revenue terms, thus at a glance, the business end user of the website marketer is pleased, but all they have is a snapshot of data in a two dimensional table. When the FIG. 6 data is put into a three-dimensional display cube in FIG. 7 we see a three-dimensional display cube visual representation of the FIG. 6 table data, wherein the terms "boots" and "shoes" are actually shown to be way underperforming, in this case this particular brand is well known for "boots" and "shoes", so seeing the data this way quickly pointed out the need to investigate why these two search terms were not performing. What FIG. 7 shows is that this particular business has a wide selection of booties or what is termed ankle boots that were not tagged with the term "boots", and their wide selection of flats was not tagged with the term "shoes", and once this issue was correctively addressed, these website tags of "boots" and "shoes" enabled a significant improvement in the conversion rate of visits that were searching for "boots" and "shoes" as shown in FIGS. 8 and 9 as a correction to the on-site search data parameters, thus allowing website customers to be exposed to more accurate groupings of goods and resulting in significant improvements in website orders and revenue.

Figure 10:
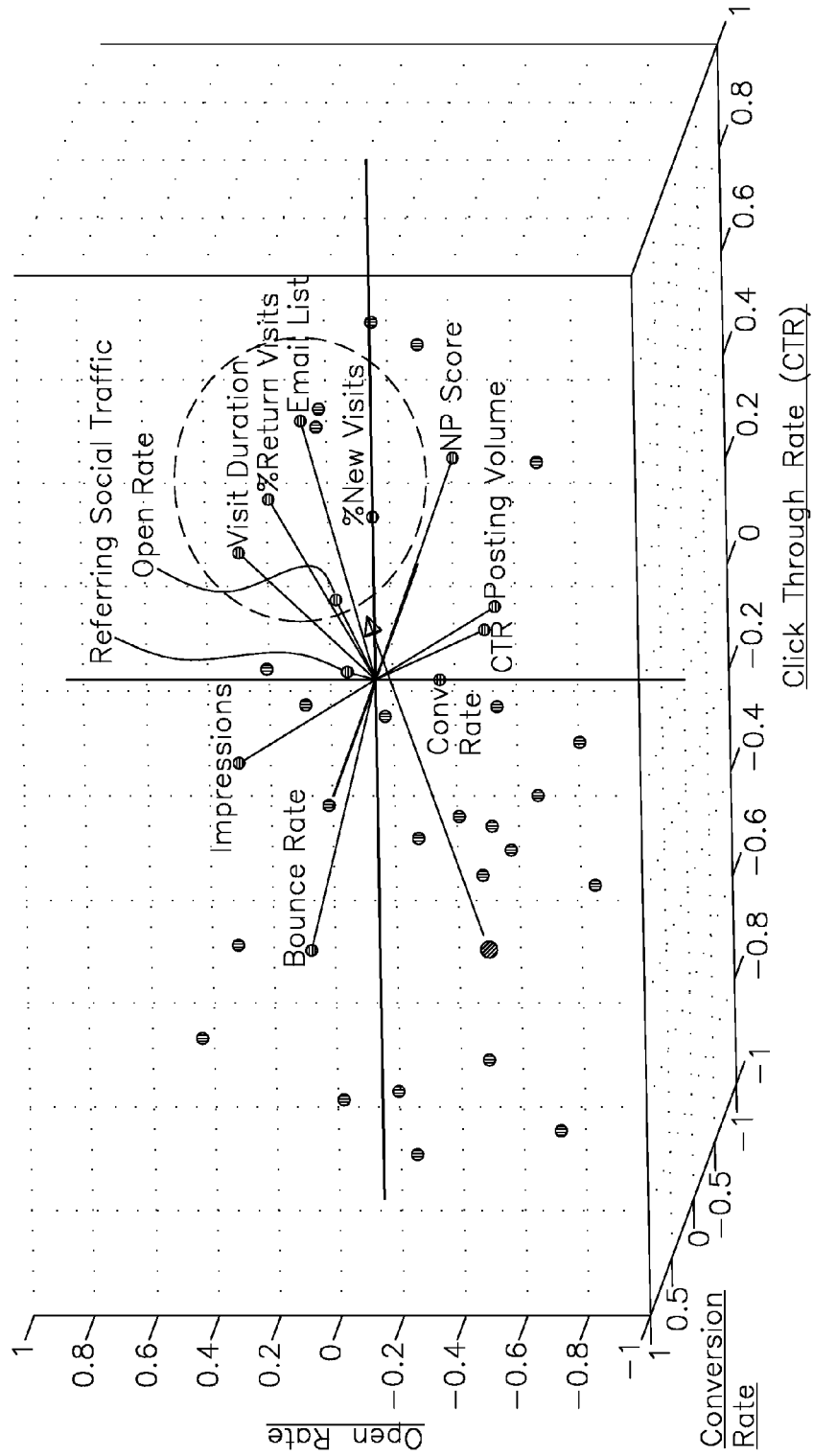
FIG. 10 shows a three dimensional visual cube format display for a social marketing index.
Figure 11:
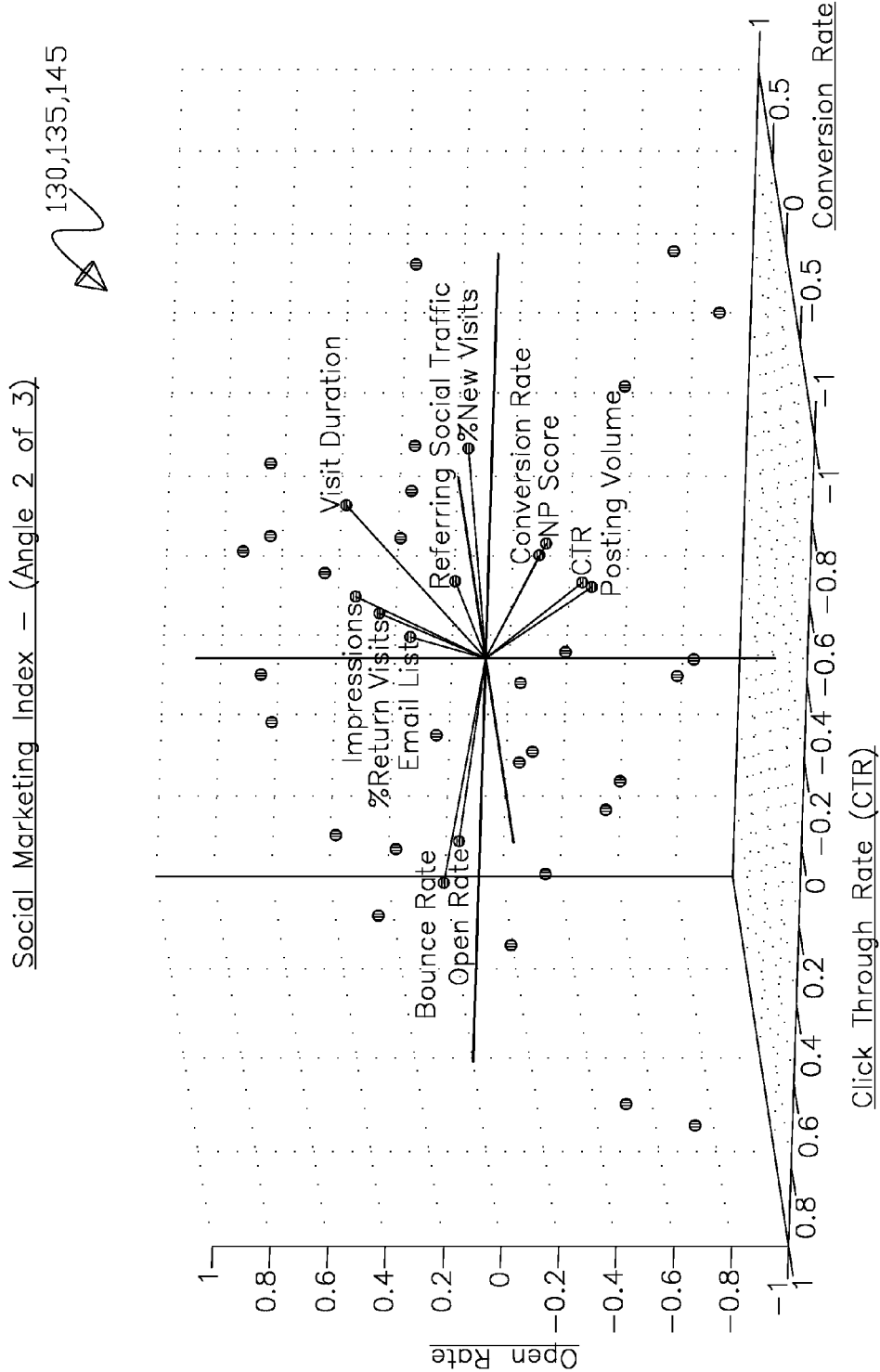
FIG. 11 shows a rotation of the three dimensional visual cube format display for the social marketing index of FIG. 10.
Figure 12:
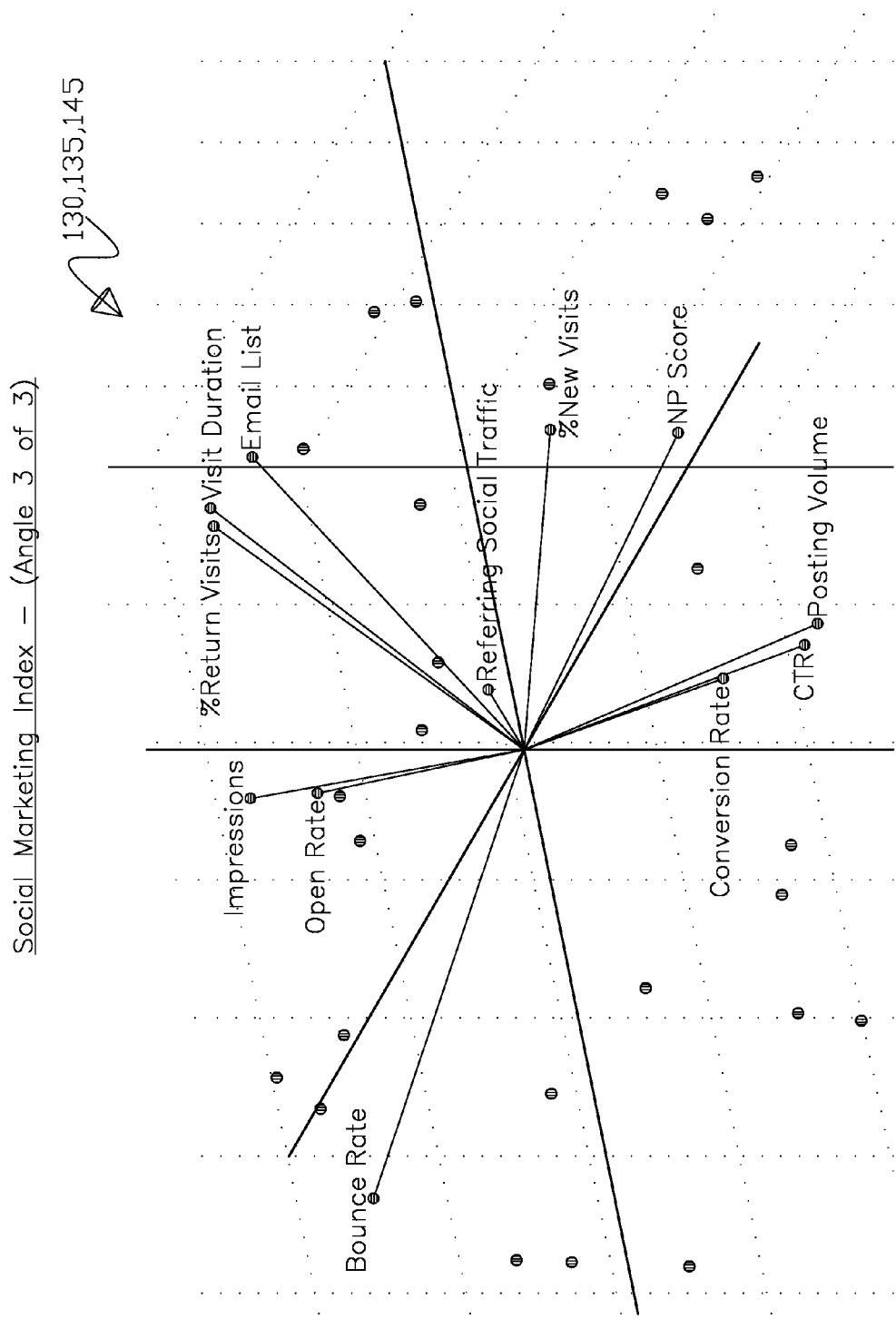
FIG. 12 shows a zoom in of the three dimensional visual cube format display for the social marketing index of FIG. 10.

In looking at FIGS. 10, 11, and 12, wherein FIGS. 10, 11, and 12 are different rotations of the same three-dimensional cube, demonstrate that data with more than 6 attributes can also be viewed in a three-dimensional cube by using principal component analysis. The example in FIGS. 10, 11, and 12 show a social marketing score that is calculated for a number of companies based on a total of 12 attributes including Click Through Rate (CTR), conversion rate, open rate, bounce rate, email list, impressions, visit duration, % new visitors, % return visitors, posting volume, Net Promoter Score (NPS), and social referring traffic. The definition of posting volume is the secondary activity based upon an on-line entry-such as a comment on a blog post, or a "like" on a posting, and similar follow on posts based on an initial posting. The definition of NPS is that NPS basically divides customer into three groups, first—the "promoters" who are highly satisfied and loyal customers who encourage others to do the same, second the "passives" who are basically satisfied customers, but can be easily convinced to move to the competition, and third the "detractors" who are unhappy customers that will take their business elsewhere at the first opportunity. The NPS equals the "promoters" minus the "detractors" in percentages, thus a well performing and growing company will have a NPS score that is greater than two times the average company in a given industry, thus the bottom line is that to have a positive NPS score the "promoters" must outnumber the "detractors", plus by a substantial amount, wherein an average company may only be at an NPS of 5 to 10 percent and a high performing company would be at 50 to 80 percent for their NPS.

Further in FIGS. 10, 11, and 12, the X, Y, and Z axes represent the first, second, and third principal components, respectively. The 12 attributes are also plotted in the three-dimensional cube (blue arrow lines-horizontal hash marks in the application). Red dots (vertical hash marks in the application) represent companies. Referring in particular to FIG. 10, the cube indicates the companies with higher social marketing scores are in the upper right hand corner and the companies with lower social marketing cores are in the lower left hand corner. The FIGS. 10, 11, and 12 display cubes help companies with lower social marketing scores quickly identify what attributes they need to improve in order to improve the social marketing scores, the example shows what measured attributes indicated by a green circle (angled hash marks in the application) a company needs to improve, by being in the lower left hand corner of FIG. 10 for instance. Thus in FIGS. 10, 11, and 12 the dashed line circle represents the social media desired attributes that need to be improved, i.e. visit duration, % return visits, email list, and % new visits, for a poorly performing social media index company in the poorly performing lower left hand corner to move to the better performing upper right hand corner.

Figure 13:
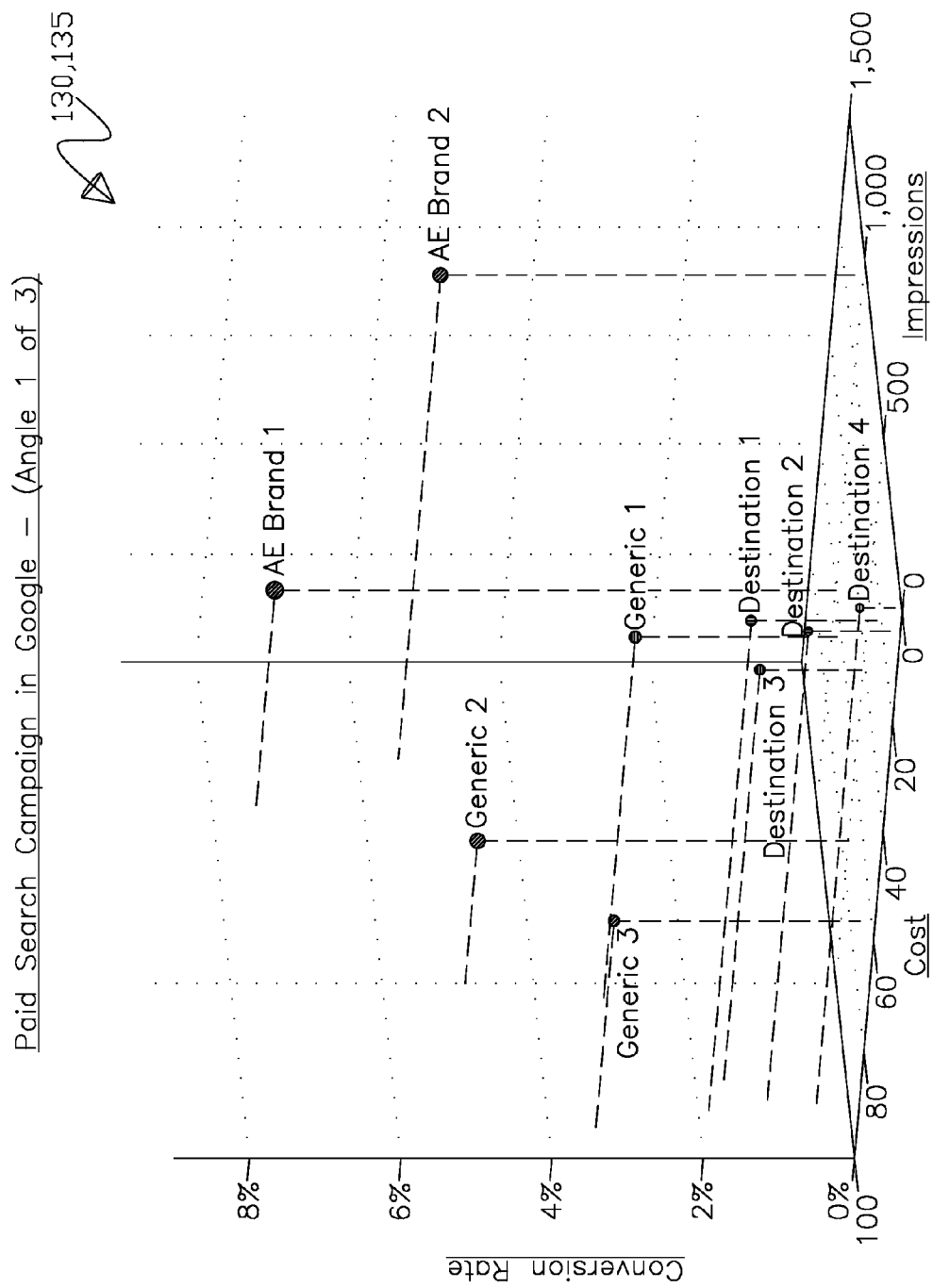
FIG. 13 shows a three dimensional visual cube format display for a paid search campaign.
Figure 14:
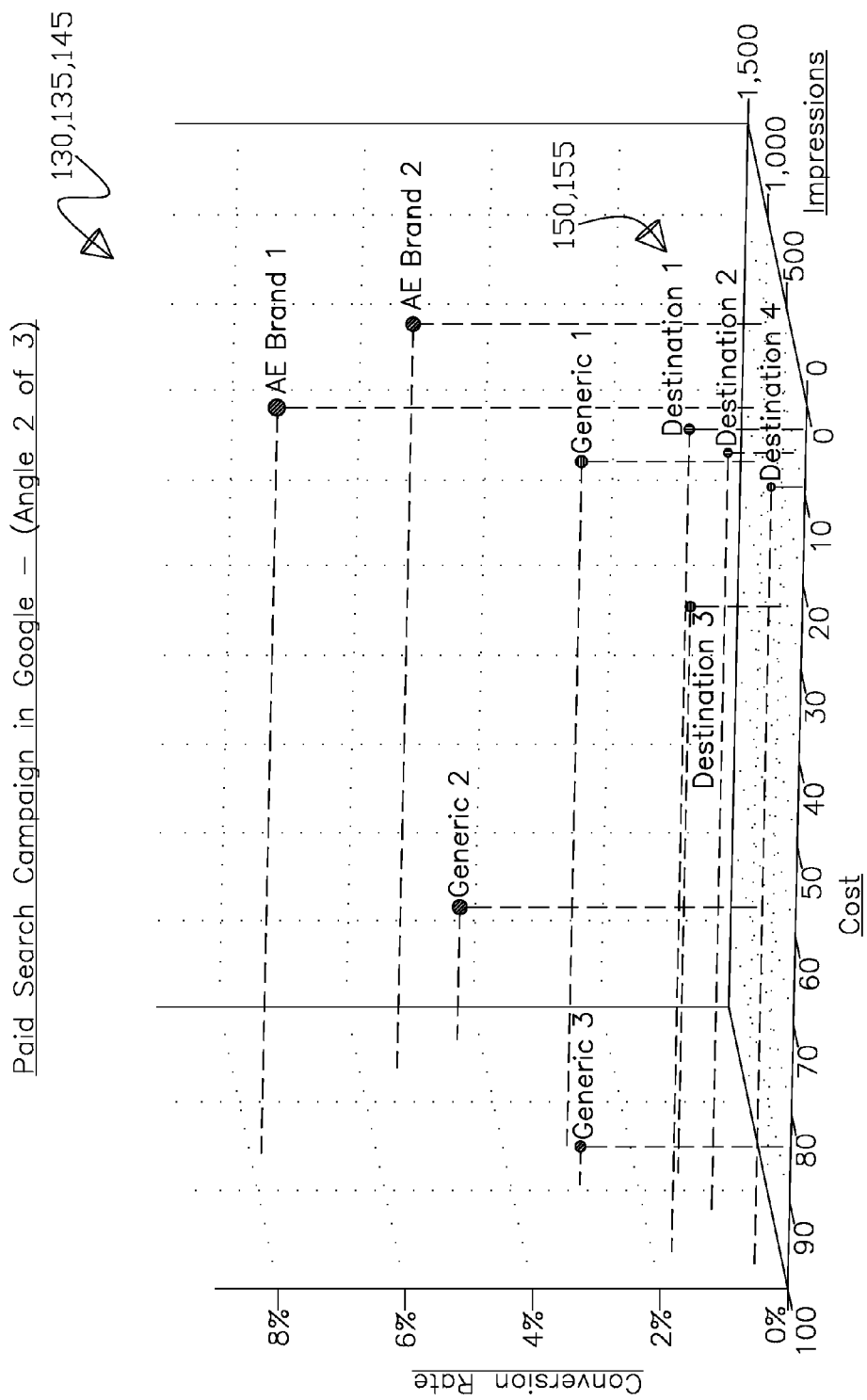
FIG. 14 shows a rotation of the three dimensional visual cube format display for paid search campaign of FIG. 13.
Figure 15:
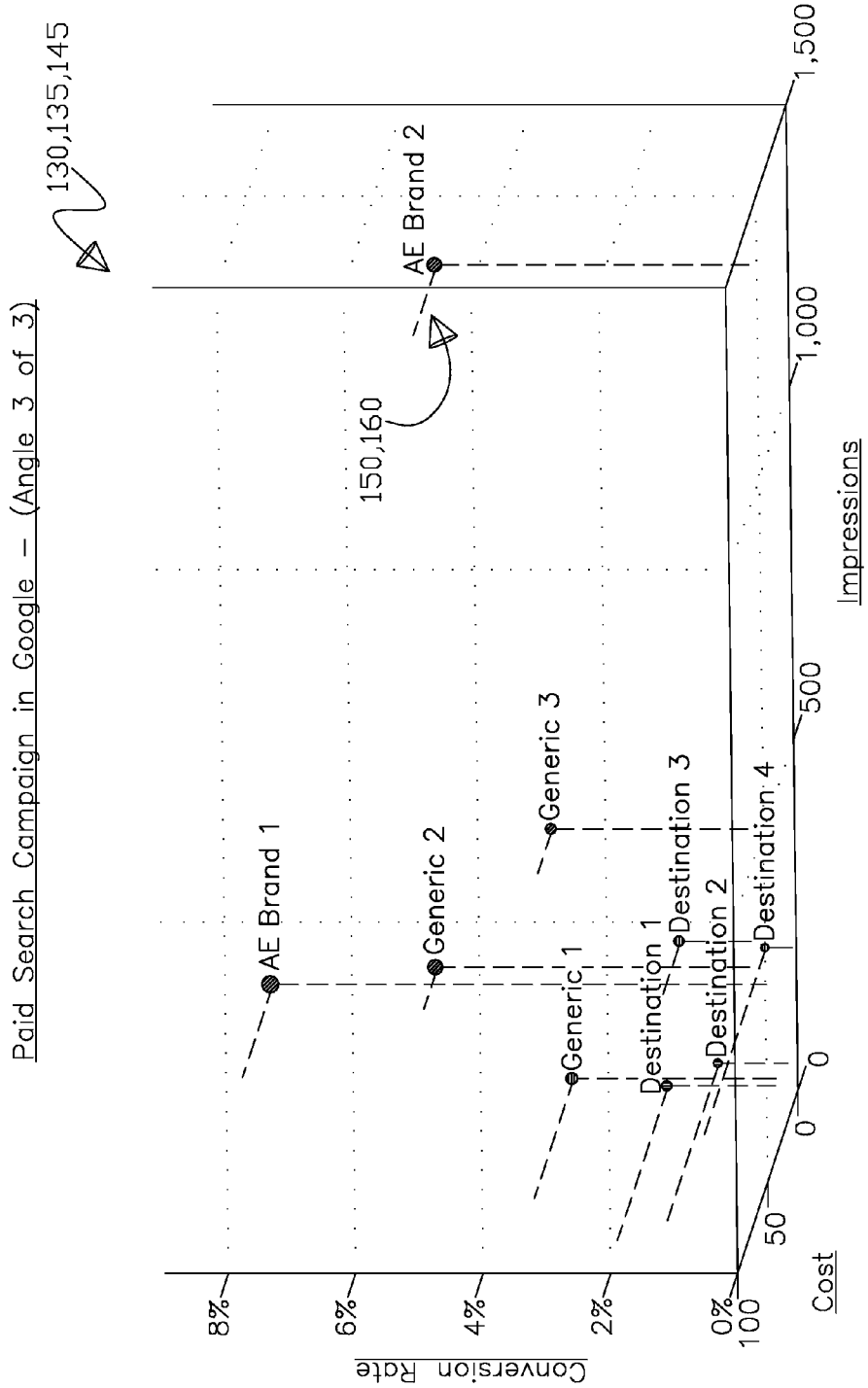
FIG. 15 shows a further rotation of the three dimensional visual cube format display for paid search campaign of FIG. 13.
Figure 16:
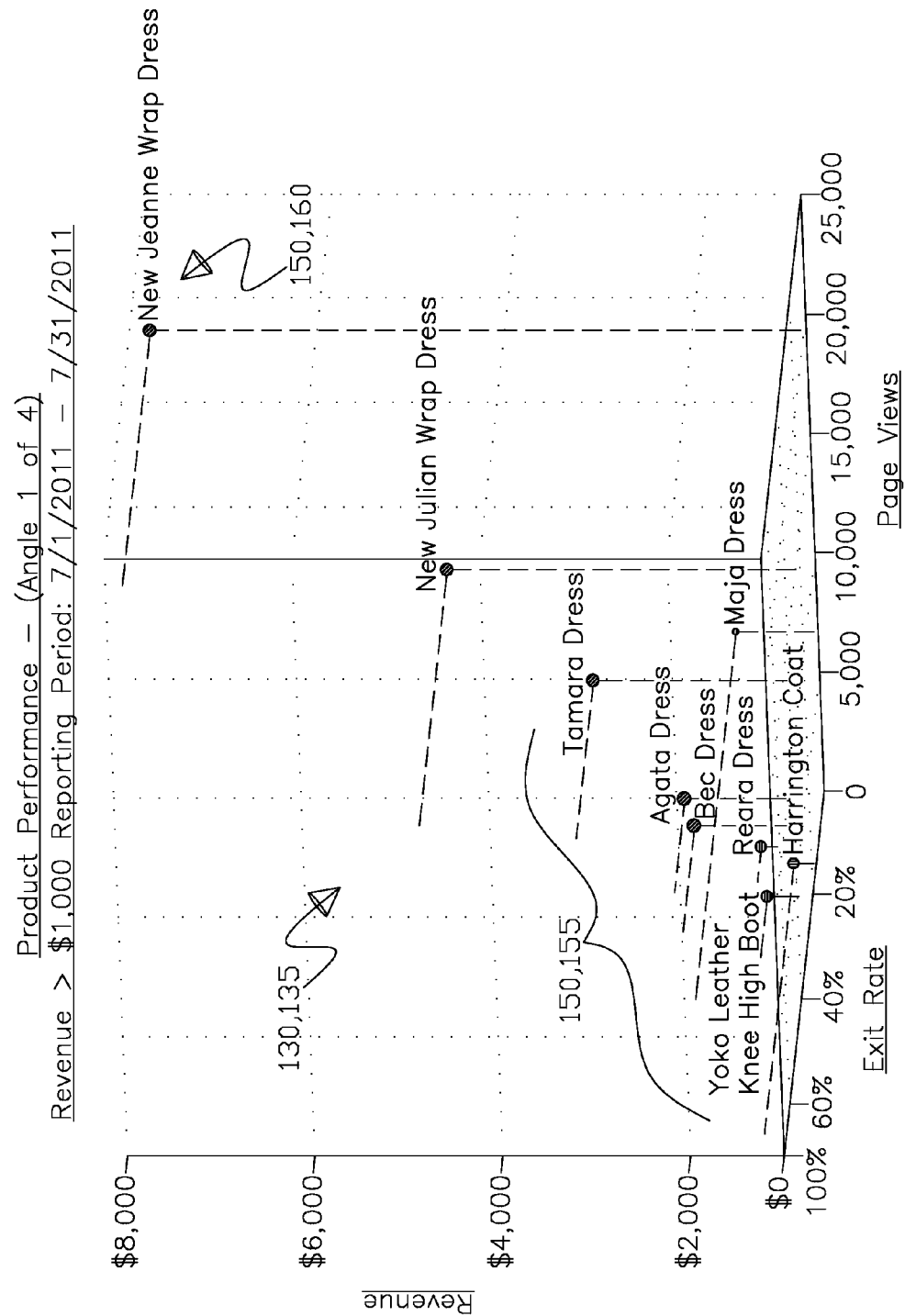
FIG. 16 shows a three dimensional visual cube format display of product performance.
Figure 17:
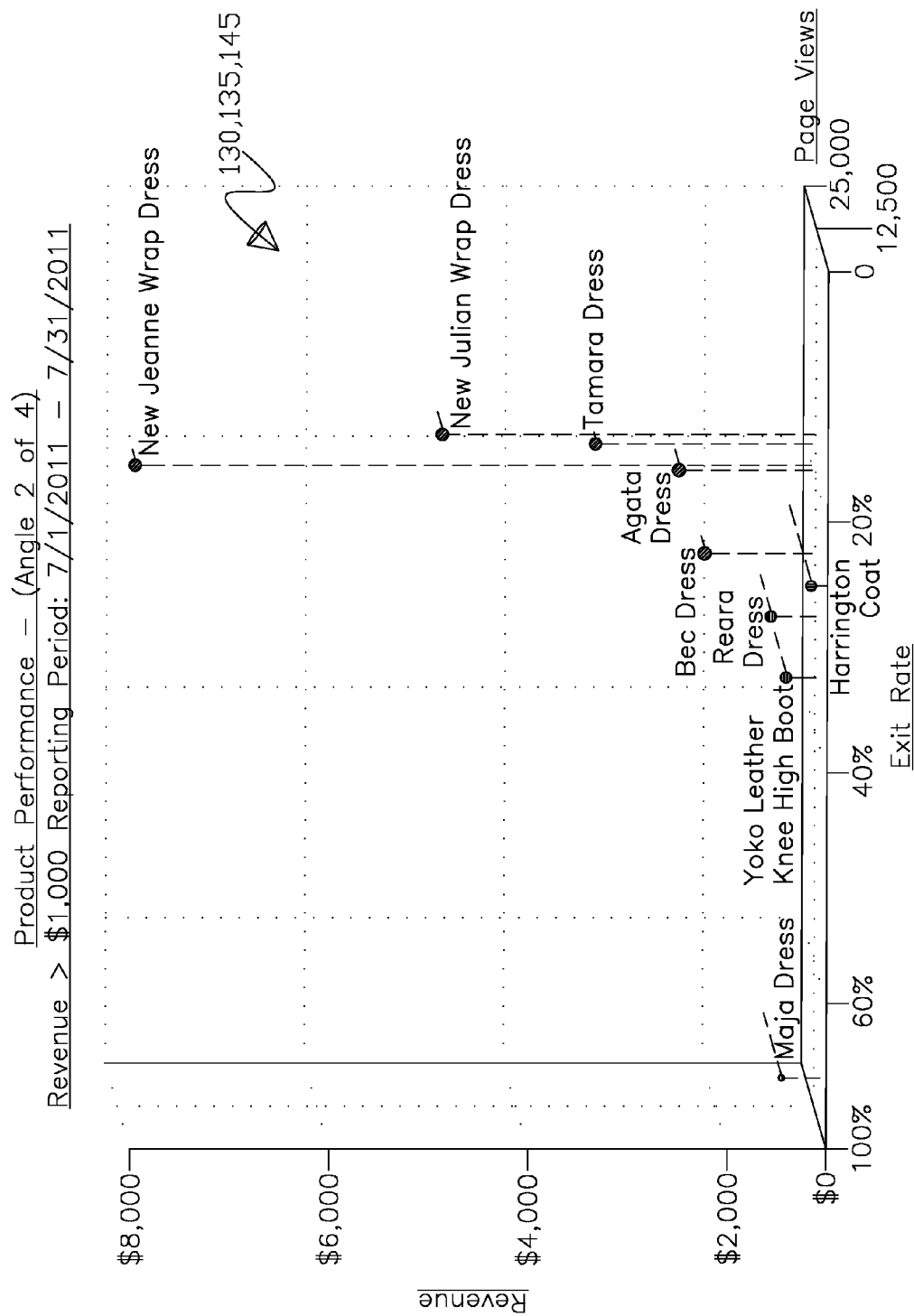
FIG. 17 shows a rotation of the three dimensional visual cube format display for the product performance of FIG. 16.
Figure 18:
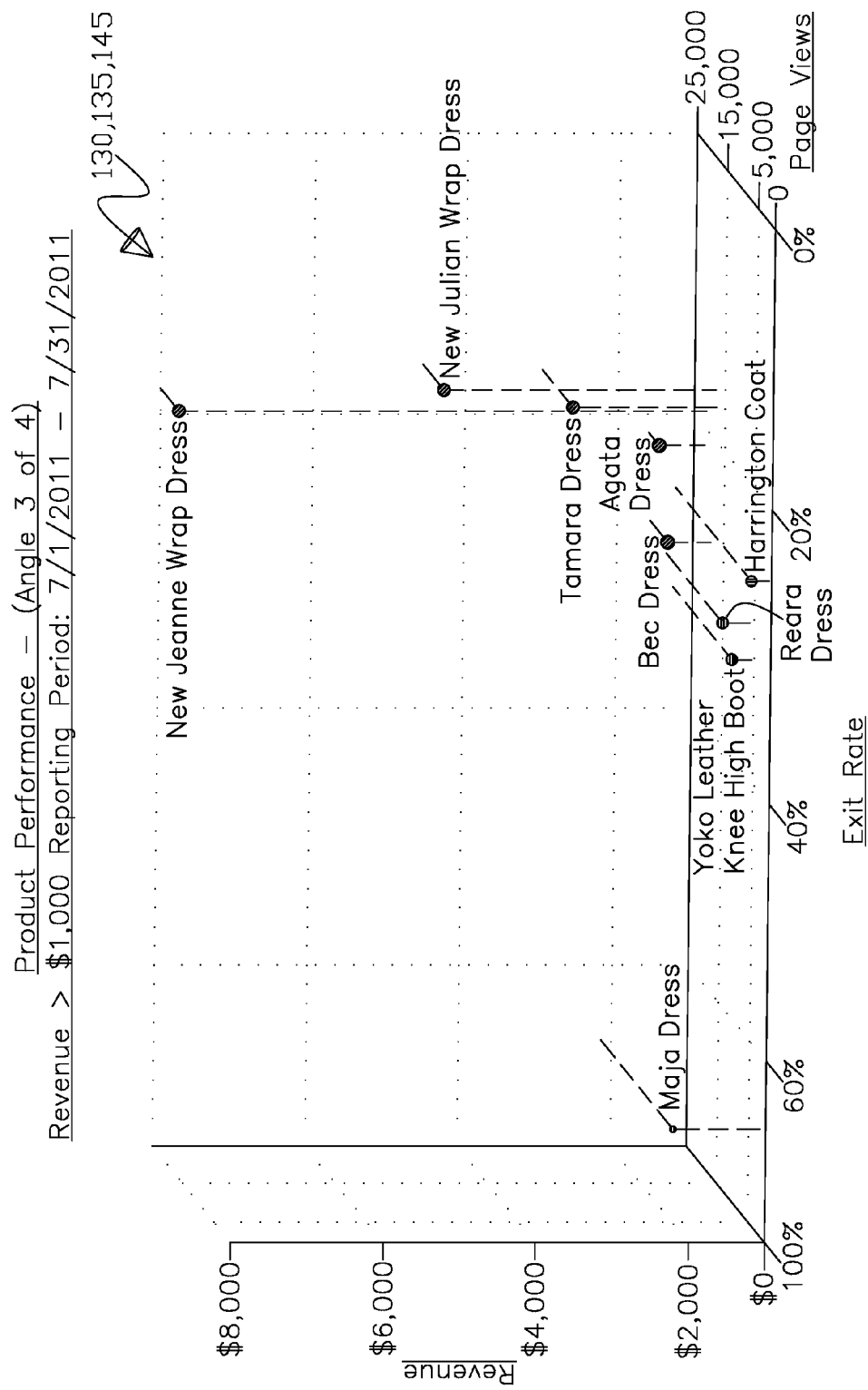
FIG. 18 shows a further rotation of the three dimensional visual cube format display for the product performance of FIG. 16.
Figure 19:
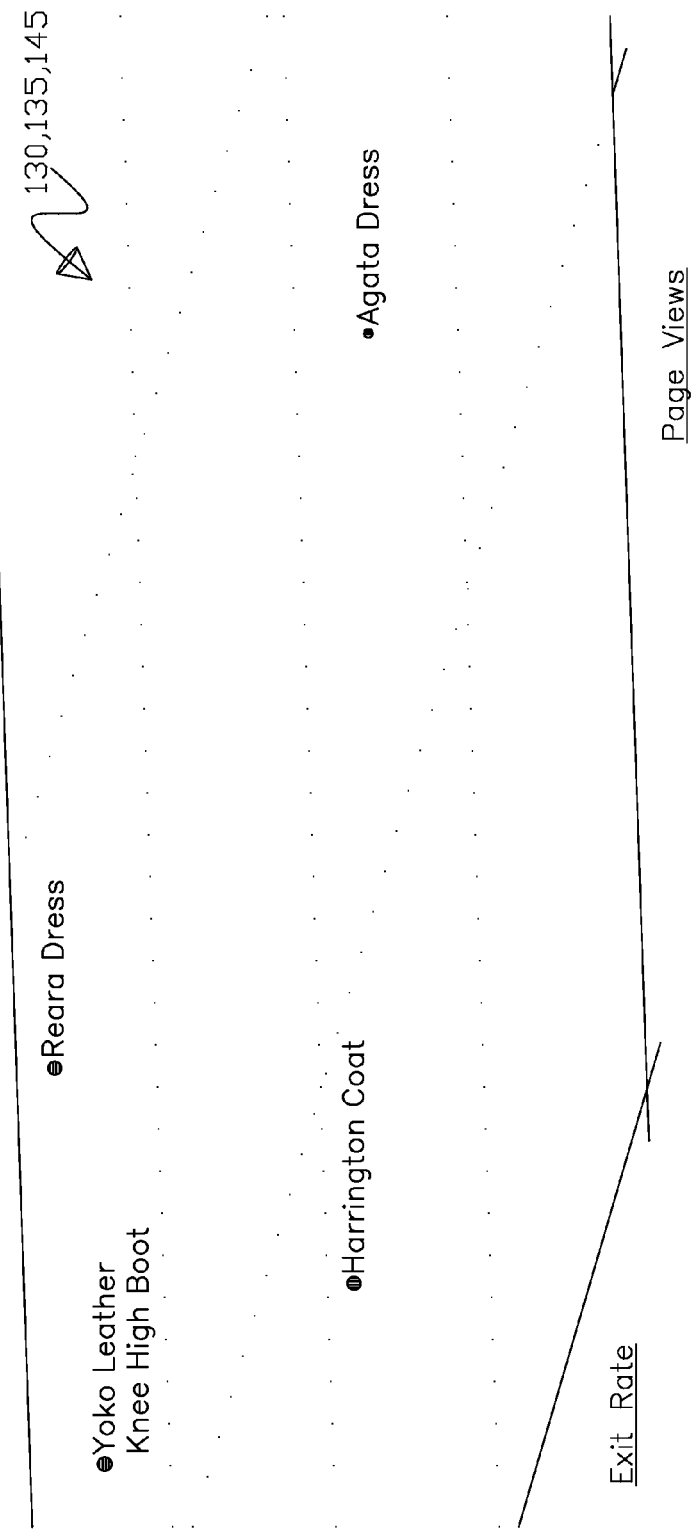
FIG. 19 shows a further rotation of the three dimensional visual cube format display for the product performance of FIG. 16.

Looking at FIGS. 13, 14, and 15, wherein FIGS. 13, 14, and 15 are different rotations of the same three-dimensional data, the three-dimensional display cube is used to determine what search position is best in a paid search campaign in GOOGLE for example, wherein 9 elements are shown being two brand name search descriptors, four destination search descriptors, and three generic search descriptors. In FIG. 15 for example, the circle represents the position, color represents total revenue (represented as angled, horizontal, and vertical hash marks in the application), the size of circle represents the conversion rate, the X axis represents total number of impressions, the Y axis represents conversion rate, and the Z axis represents the cost. Thus in looking at FIG. 15 it is needed to determine what is the best position for generic terms and in evaluating the performance of the generic terms in generic position one through position three. In FIG. 15 for example, considerations are the total number of impressions (eyeballs), the cost, the total revenue and the conversion rate, conventional wisdom would think that generic position one is the best performing position and for many brands it is, however, in this case, it becomes very clear that generic position two for generic terms significantly outperforms generic position one and generic position three.

Next, in referring to FIGS. 16 through 19, wherein FIGS. 16 through 19 are different rotations of the same three-dimensional data, shown are products from a fashion products website indicating which products had the most interest (most page views) and the most revenue and comparing the exit rate (people left the site from this page and did not make a purchase). Further in FIGS. 16 to 19, three dresses really stand out being the New Jeanne Wrap Dress, the New Julian Wrap Dress, and the Tamara Wrap Dress, the Maja Dress also had a high volume of page views but the blue dot represents that it is in the middle ⅓ of revenues (horizontal hash marks in the application) and the small circle size indicates that it had a low conversion rate. When the display cube is rotated from FIG. 16 to FIGS. 17 through 19, we see that the Maja Dress has an extremely high exit rate, with such a high exit rate, it was suggested there was an inventory shortage issue which turned out not to be the case, after further investigation, the Maja Dress received a lot of fashion press when a celebrity was photographed in it, thus indicating people were just looking at it out of curiosity. Also, in FIGS. 16 to 19, the Yoko Leather Knee High Boot also had a high exit rate, in this case, inventory was extremely low with all sizes being sold out except one size, thus this is extremely valuable information for the website business owner. Further, in FIGS. 16 to 19, the Agata Dress stands out as a product with high number of page views but low revenue, after further investigation, this dress is on pre-order, with this being very insightful information for the website business owner, thus this is a fall season dress that is getting high interest. The website owner has time to make sure that there is adequate inventory and will now feature the Agata dress in email campaigns.

Figure 20:
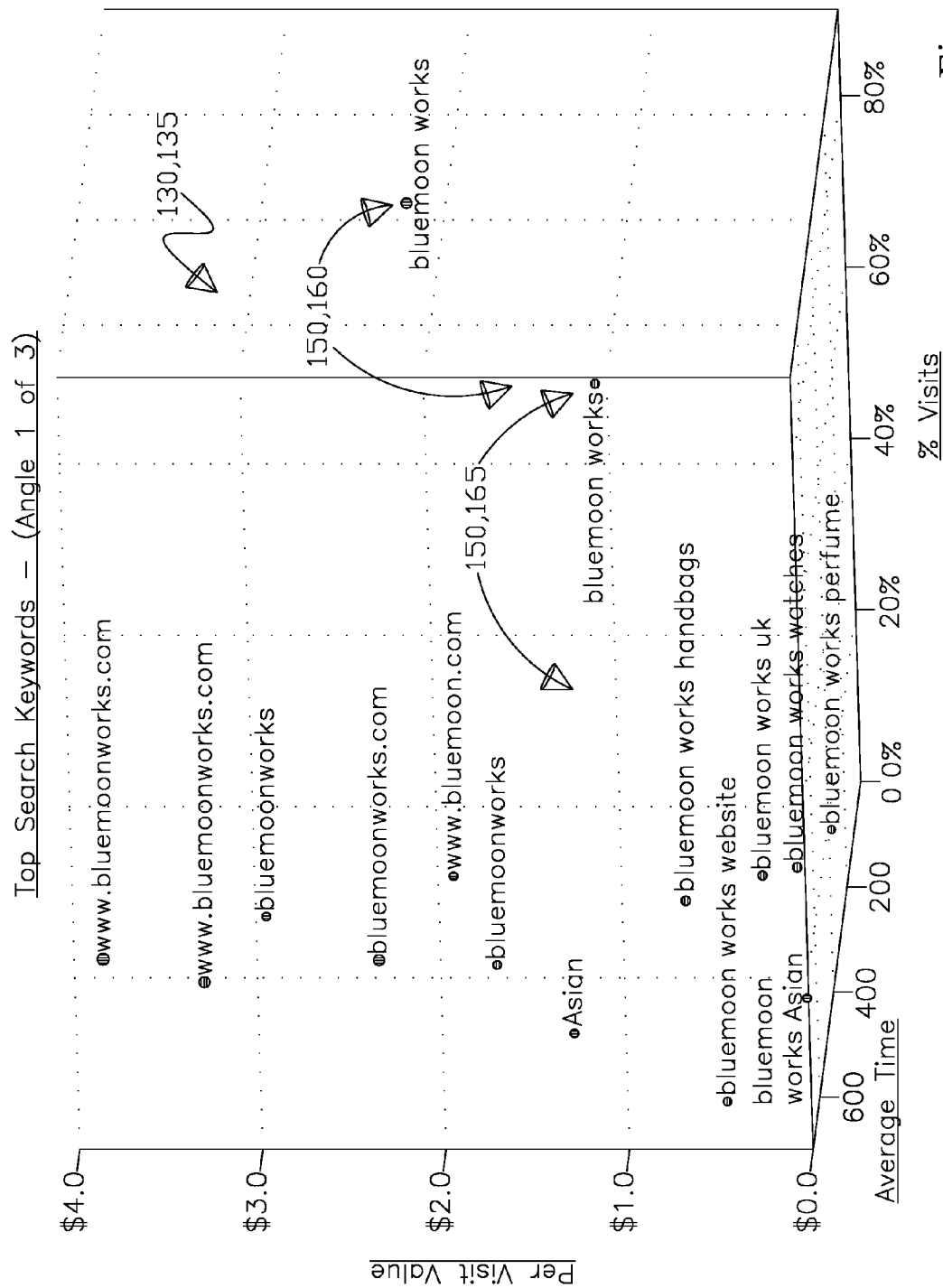
FIG. 20 shows the top twenty five organic and paid search term keywords in a three dimensional visual cube format display.
Figure 21:
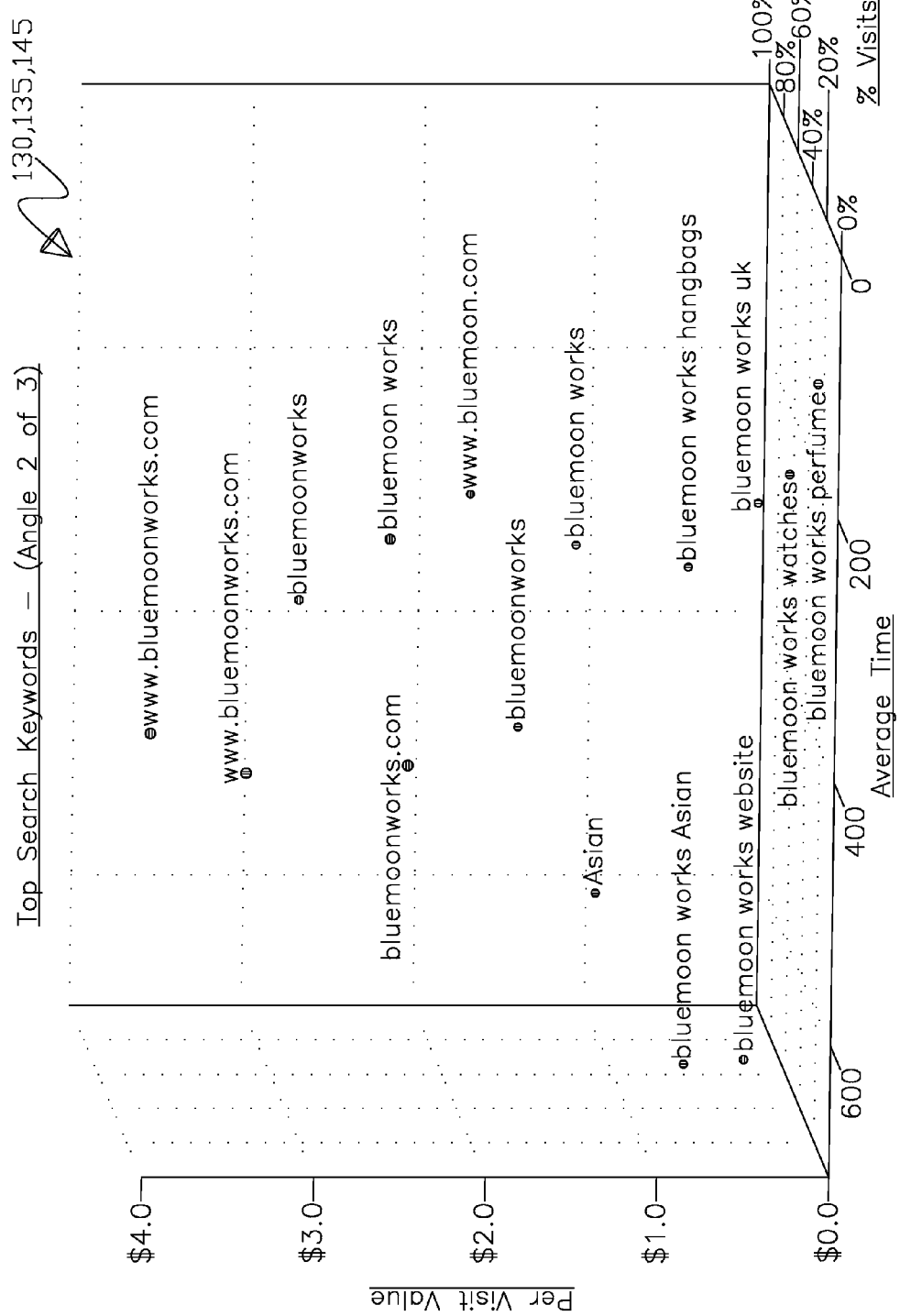
FIG. 21 shows a further rotation of the of the three dimensional visual cube format display of FIG. 20.
Figure 22:
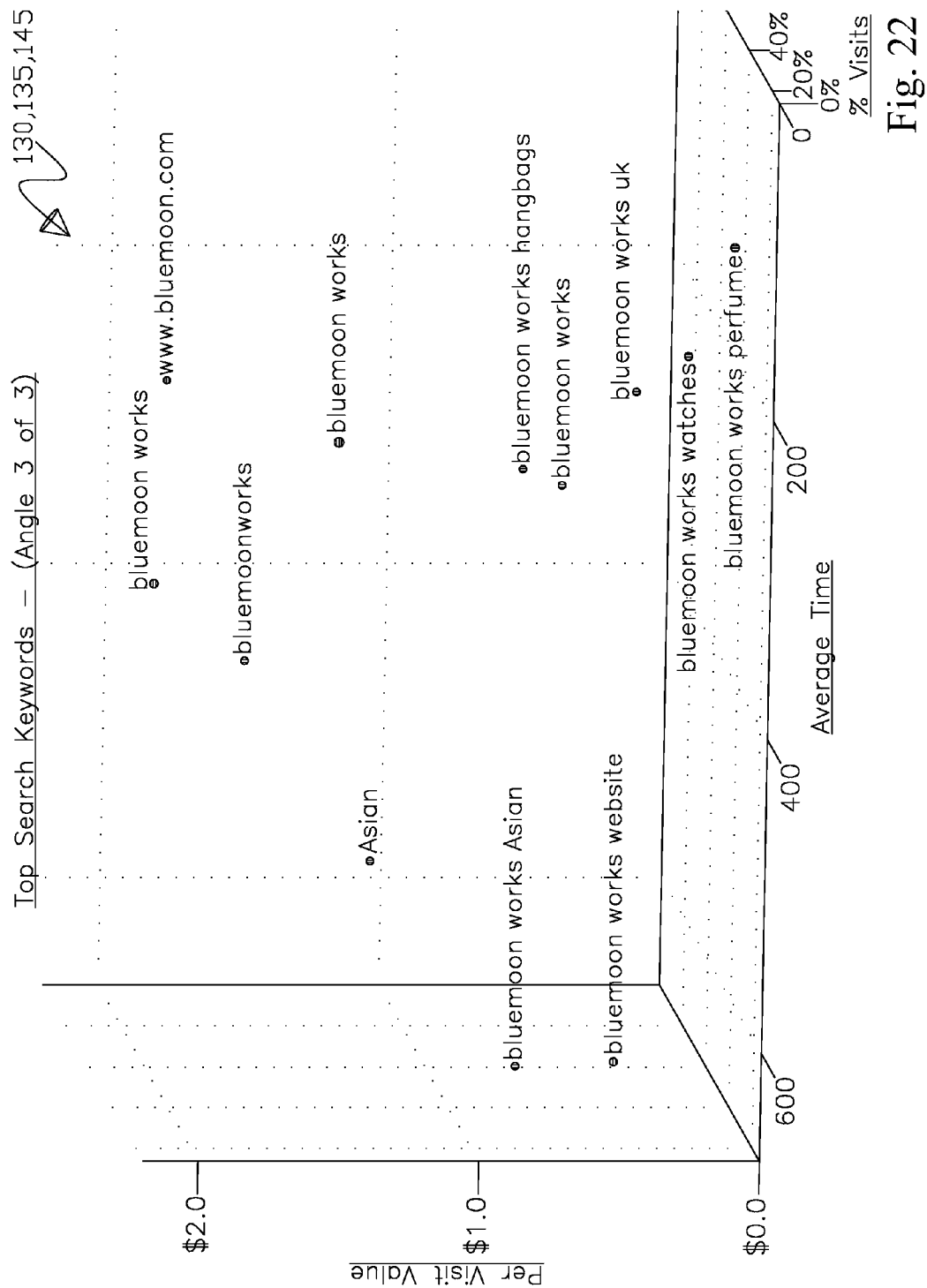
FIG. 22 shows a zoom in of the of the three dimensional visual cube format display of FIG. 21.

Further, referring to FIGS. 20, 21, and 22, the top twenty five organic and paid search keywords are shown. The green color (vertical hash lines within circle for the patent application Figures) indicates organic search keyword terms while the red color (horizontal hash lines within circle for the patent application Figures) are the paid search keyword terms. The X axis is the percent of total website visits originating from the search keywords in FIG. 20 and correspondingly the Z axis in FIG. 21. The visits percentage is calculated as ratio of the visits of each search keyword to total visits of all search keywords in the search group the search keyword belongs to, namely, organic or paid. The Y axis is the per visit value in FIGS. 20, 21, and 22, and the average time spent in seconds is shown as the Z axis in FIG. 20, as the X axis in FIGS. 21 and 22. The circle size is the conversion rate wherein the larger the relative circle the higher the conversion rate.

The following actionable insights can be taken from FIGS. 20, 21, and 22, being obtained based on the visual intelligence cube. Looking at FIG. 20, the paid brand term, bluemoon works, has much higher per visit value than organic one, $2.23 versus $1.24 and much higher conversion rate, 1.56% versus. 0.8%, see the outlier data points on the right side of FIG. 20. Therefore, it is recommended to expand the paid brand term search campaign. In addition, it is recommended to evaluate the landing pages from paid brand term and perform A/B testing of different landing pages to increase conversion rate and per visit values of the organic search traffics.

Based on FIGS. 20 and 21, the organic search traffic from Asian countries spent significantly more time on site (see left side of FIGS. 20 and 21) but have higher per visit values and conversion rates than English brand terms. Traffic from Asia is in the top 5 organic search traffics. Because there are no paid search campaigns in Asia, it is recommended to launch paid search campaigns in Asia to direct Asian customers to more appropriate product or product category pages to reduce time spent on site and create websites in Asian language to make it easier for Asian customers to navigate the site thus reducing the time spent on the site.

Figure 23:
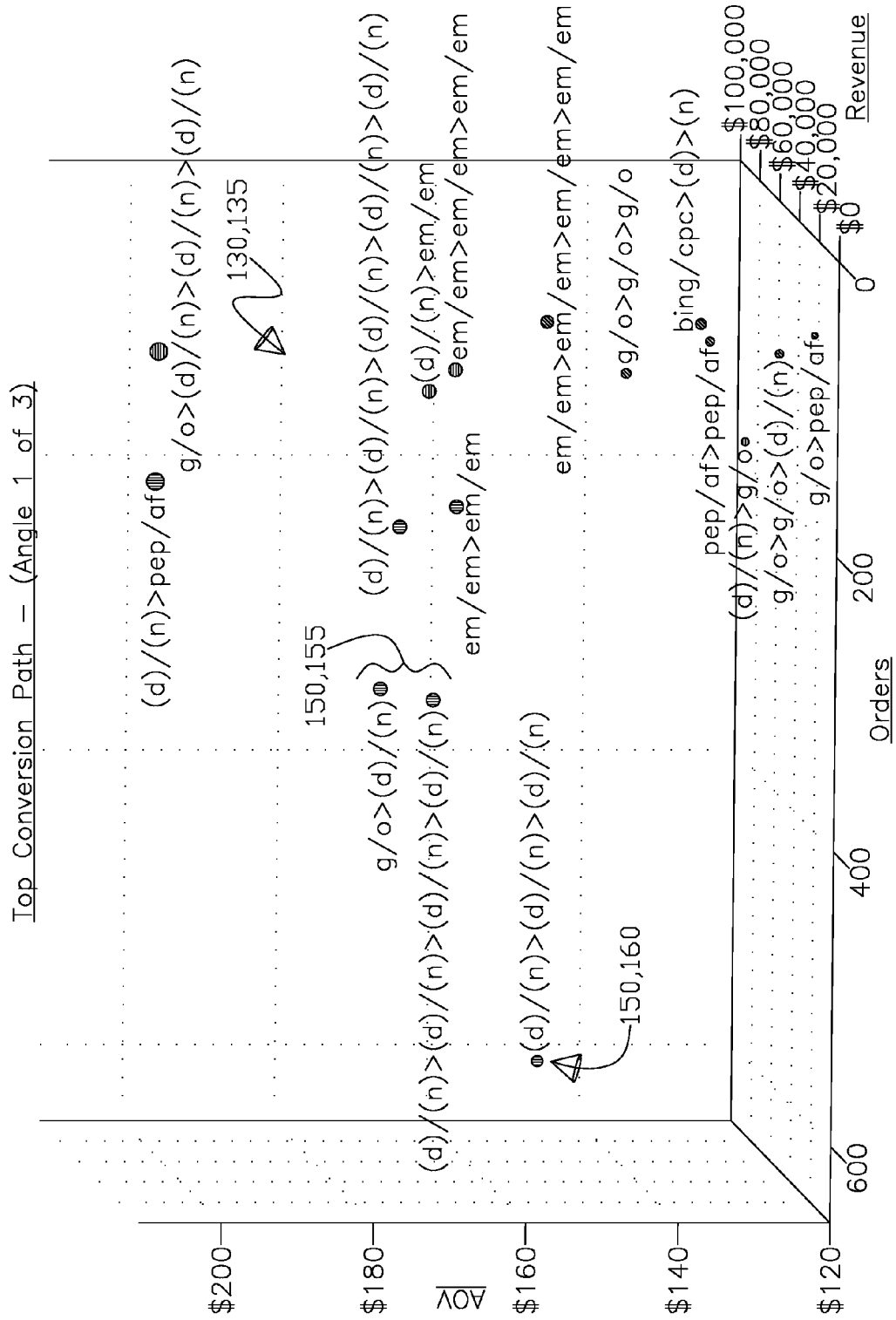
FIG. 23 shows conversion path data in so far as the length of the conversion path via abbreviations that are defined in the description all of which are in relation to average order value, number of orders, revenue, plus high, middle, and low revenue groupings, with circle size being proportional to average order value.
Figure 24:
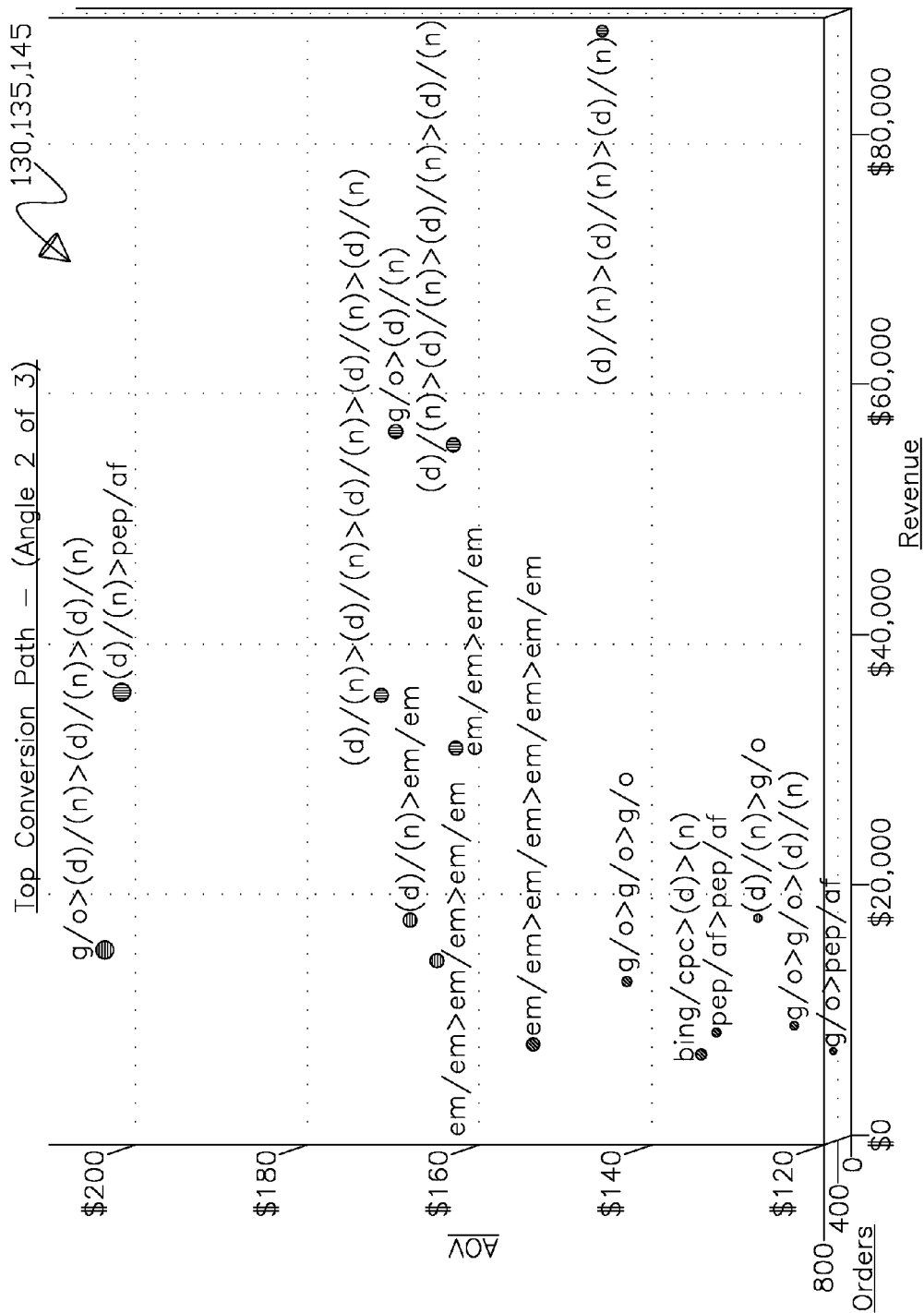
FIG. 24 is a further rotation of the three dimensional visual cube format display of FIG. 23.
Figure 25:
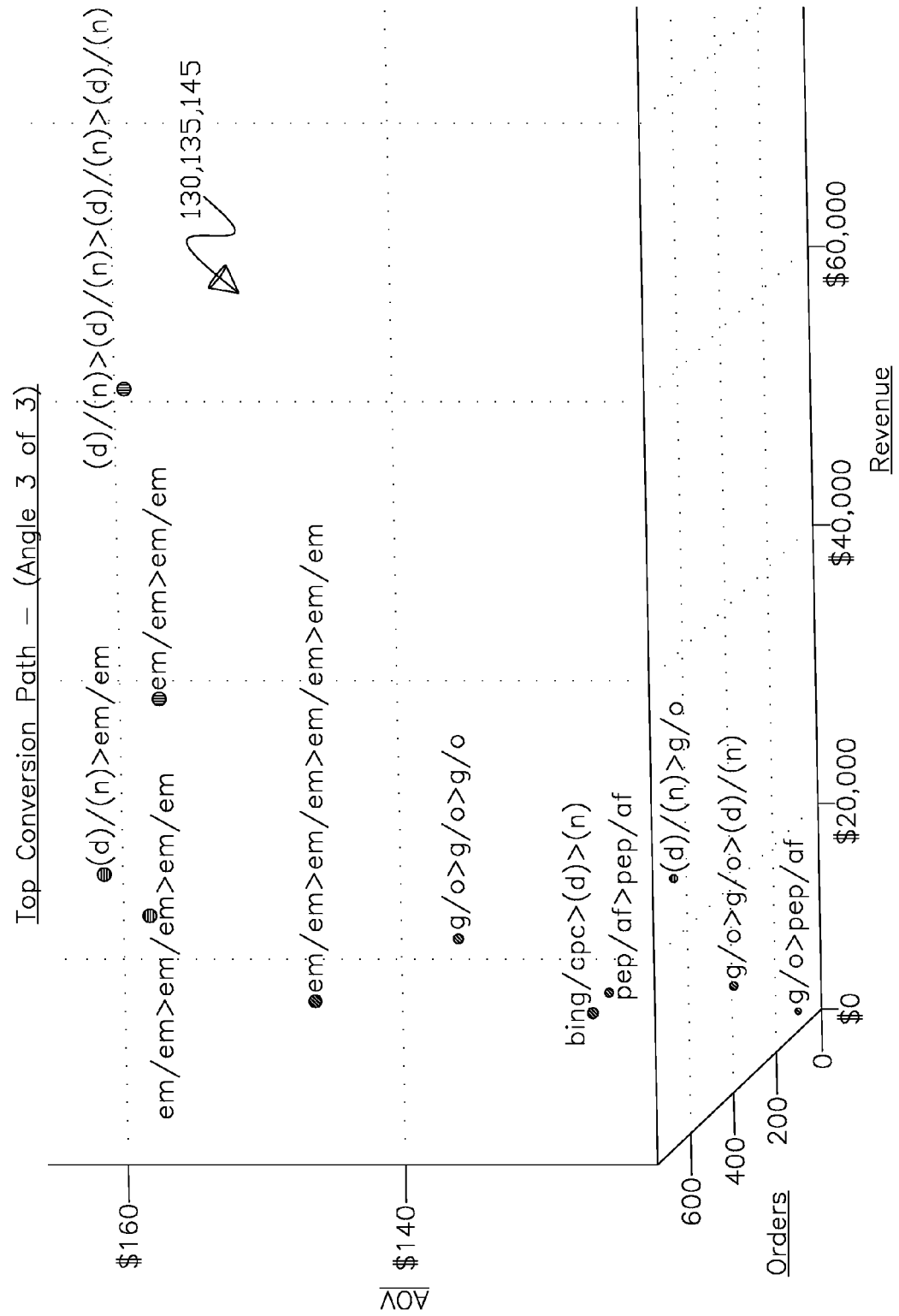
FIG. 25 shows a zoom in of the of the three dimensional visual cube format display of FIG. 24.

In referring to FIGS. 23, 24, and 25, shown is the twenty five conversion path data, wherein the Z axis is revenue in FIG. 23 and the X axis is revenue in FIGS. 24 and 25. The X axis is the number of orders in FIG. 23; the Z axis is the number of orders in FIGS. 24 and 25.

The average order value (AOV) is shown as the y axis in FIGS. 23, 24, and 25. The green color represents top ⅓ revenue (vertical hash lines in a circle in FIGS. 23, 24, and 25); the blue color represents middle ⅓ revenue (horizontal hash lines in a circle in FIGS. 23, 24, and 25) and red color for bottom ⅓ revenue (angled hash lines in a circle in FIGS. 23, 24, and 25). The circle size is the relative AOV. Please note in FIGS. 23, 24, and 25, the following abbreviations are used and are combined to determine the length of the conversion path, thus the more abbreviations for a given data point the longer the conversion path:

d—direct
n—none
em—email
pep—pepperjam (acquisition commission fee affiliate network)
o—organic
ppc—pay per click
g—Google
af—affiliate (referral fee marketing)

Looking at FIG. 23, the top revenue conversion paths in green (vertical hash lines in a circle in FIGS. 23, 24, and 25); are mostly from return customers from direct, organic search and email channels. These return customers reach the site from only two or three channels before purchases are made. In other words the length of conversion paths from the return customers in top revenue segment is only 2 or 3. Email and affiliate are effective channels for marketers to engage these customers.

Further in FIG. 24, the majority of the longer conversion paths with more than 3 channels are concentrated in price ranging from $140 to $170, the most common channels are direct, email, and organic search that indicate the return customer segment. These return customers visit the site more than 3 times before making purchases, which suggests these customers spent more time to study products. Thus it is recommended that the site provide a comparison tool, such as category search, sorting by size, color, style, to make it easier for customers to study products in order to shorten the conversion paths that may result in higher revenue and reduce the site revisits.

Thus in FIGS. 23 and 24, for products below $140 price, the channels include pay per click, affiliate, organic search, and direct. The conversion paths include 2 or 3 channels. This segment includes both return and new customers who are cost conscious. The number of orders and revenue are low for this segment. One potential action is to introduce higher price products in affiliate channels with higher discount that may result in higher revenue.

Figure 26:
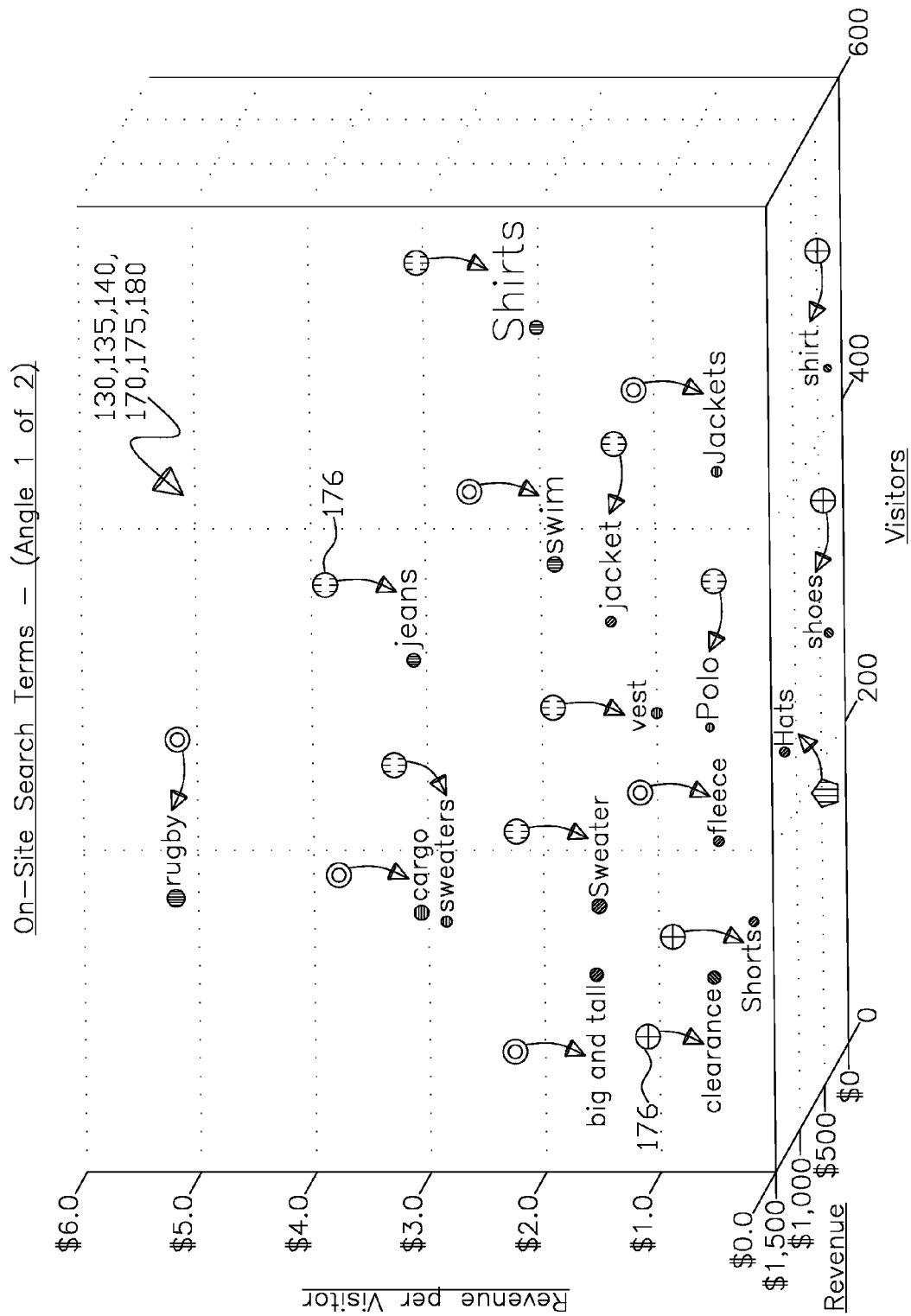
FIG. 26 shows the three dimensional visual cube format display with five additional data parameters making for eight parameters shown that include the relative size of the circles that indicates the conversion rate, the color of the circles (see hash mark guide in description) indicating the revenue of the search term, the size of the search term text being indicative of search term frequency, search term color (see hash mark guide in description) being the indicator of average order value, and the search term itself.
Figure 27:
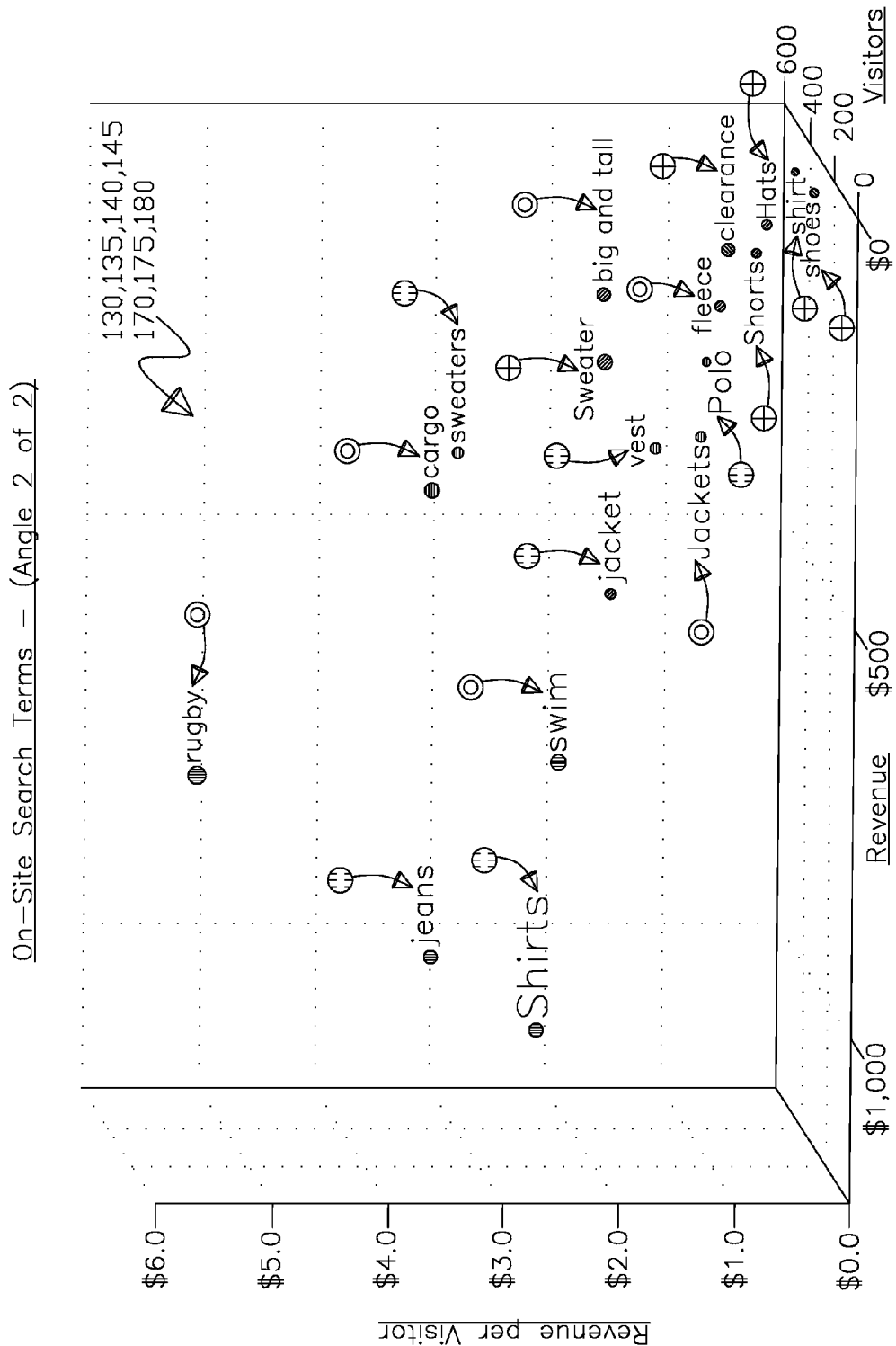
FIG. 27 is a further rotation of the eight dimensional visual cube format display of FIG. 26.

In referring to FIGS. 26 and 27, presented is an eight-dimensional site search term data which includes visitors, revenue is represented by the Z axis in FIG. 25 and the X axis in FIG. 27, total revenue represented by circle color green (vertical hash lines in a circle in FIGS. 26 and 27), cyan (horizontal hash lines in a circle in FIGS. 26 and 27), red (upward angled hash lines left to right in a circle in FIGS. 26 and 27), blue (downward angled hash lines left to right in a circle in FIGS. 26 and 27), and pink (horizontal dashed lines in a circle in FIGS. 26 and 27, not shown), revenue per visitor, search frequency in visitors, average order value (AOV), or revenue per visitor, conversion rate, and search terms. The X axis is number of visitors who conduct onsite searches in FIG. 26 and the Z axis in FIG. 27; the Z axis is revenue each search term generates in FIG. 26 and the X axis in FIG. 27; and the Y axis is revenue per visitor in FIGS. 26 and 27. Circle color represents revenue that is divided into 5 segments. Green, cyan, blue, pink, and red represents the revenue segments from top to bottom. Relative circle size is conversion rate, a larger circle equals a higher conversion rate and a smaller circle equals a lower conversion rate. Search term text size represents search frequency that is the ratio in percentage of number of times a search term is searched onsite over total number of searches. Search term text colors, black (vertical dashed lines in a circle in FIGS. 26 and 27), cyan (smaller circle in a larger circle in FIGS. 26 and 27) and red (cross hairs in a circle in FIGS. 26 and 27), represent top ⅓, middle ⅓ and bottom ⅓ of average order value or AOV, respectively. Thus FIGS. 26 and 27 represent eight different parameters that are visually displayed simultaneously, showing the interactive nature of a significant amount of website analytical data, the eight different parameters are; the three dimensional axes-being the revenue per visitor, the total revenue, and the number of visitors—for the first three parameters, next the relative size of the circles indicates the conversion rate for the fourth parameter, the color of the circles indicating the revenue of the search term being the fifth parameter, the size of the search term text being indicative of search term frequency as the sixth parameter, search term color being the indicator of average order value-being the seventh parameter, and the search term itself-being the eighth parameter.

The following actionable insights can be obtained based on FIGS. 26 and 27, looking at FIG. 26 in particular, the search term "Shirts" generates higher revenue, conversion rate than "shirt". The search result page for "Shirt" includes large number of lower price products as evidenced by AOV (text color). Recommend use "Shirts" search result page for "Shirt". Similarly, search terms "jacket" and "jackets" perform differently. Recommend use "jacket" search result page for "Jackets". Also "Coats" is a top searched term (text size) that generates no revenue. In this example, the data are for the month of September. The fact that "Coats" is one of the top search terms indicates that customers are interested in winter products. Recommend to create a new winter product feature page that provides customers with more information on new winter products. In addition, "Rugby" search term has highest revenue per visitor and conversion rate, and is in the top revenue segment although number of searches (text size) and visitors are low. Recommend to use other marketing channels such as pay per click, display ad, print media, ratio, and TV to promote the rugby products and drive higher traffic to the products.

Looking at FIG. 27, revenue for search term "shoes" is low even though "shoes" is one of the highly search terms (text size). The search result page for "shoes" includes many shoes that are not categorized that may confuse customers. Recommend categorize the "shoes" search result page by gender and age.

Figure 28:
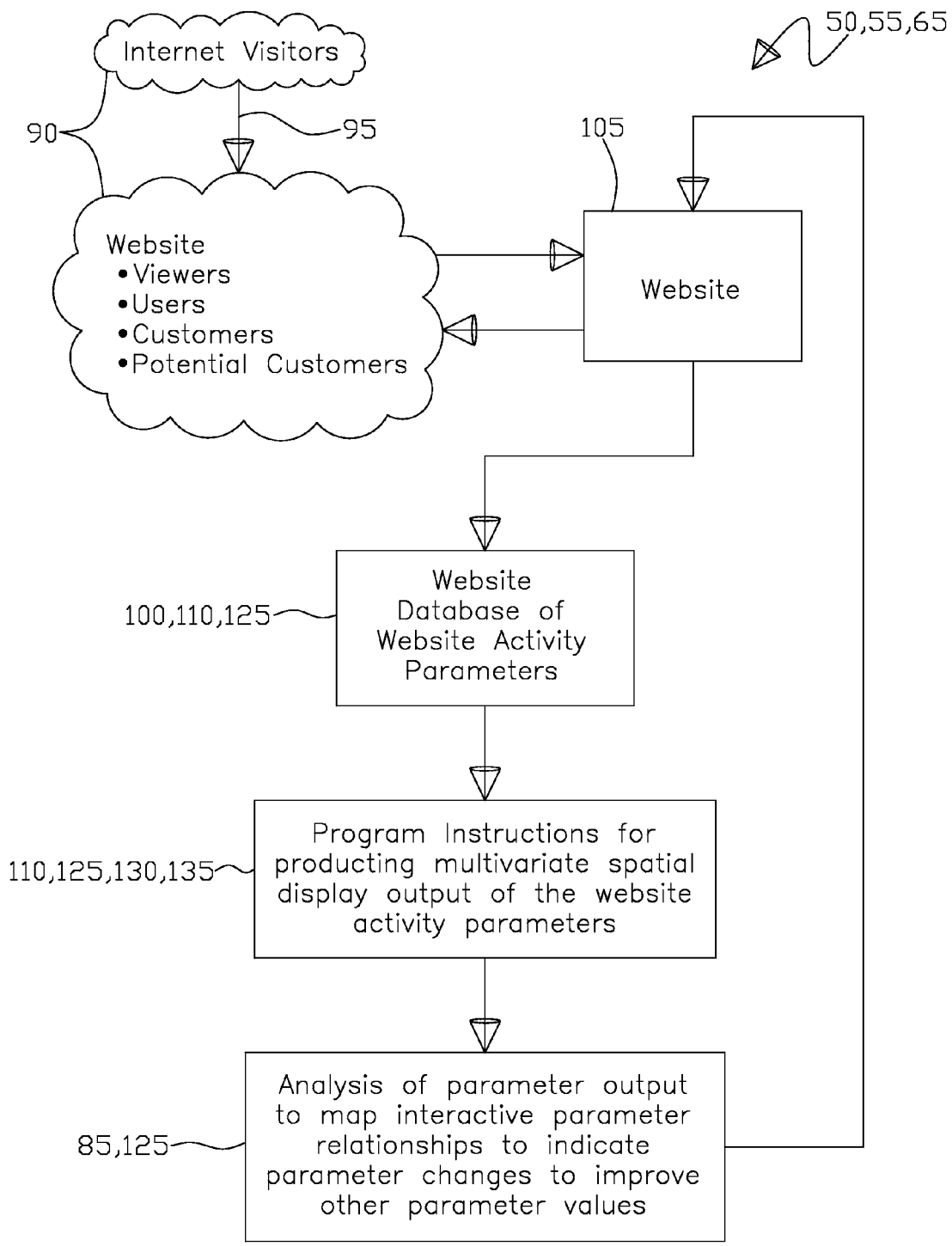
FIG. 28 is a diagrammatic summary flow chart on the internet marketing analytics system showing the website, the website visitors that include viewers, users, customers, and potential customers, plus the website database of website activity parameters, further the program instructions that include instructions for producing a multivariate spatial display output of the parameters, and the analysis of parameter changes upon other parameters from mapping the interactive relationships of the parameters.

Further, to FIG. 28 shown is a diagrammatic summary flow chart on the internet marketing analytics system 50, remote access apparatus 55, and product 65 showing the website 105, the website 105 visitors 90 that include viewers, users, customers, and potential customers, plus the website database 100 of website activity parameters 100, further the program 125 instructions that include instructions for producing a multivariate spatial display 130 output of the parameters 100, and the analysis of parameter 100 changes 145, 150, upon other parameters 100 from mapping the interactive relationships of the parameters 100.

Figure 29:
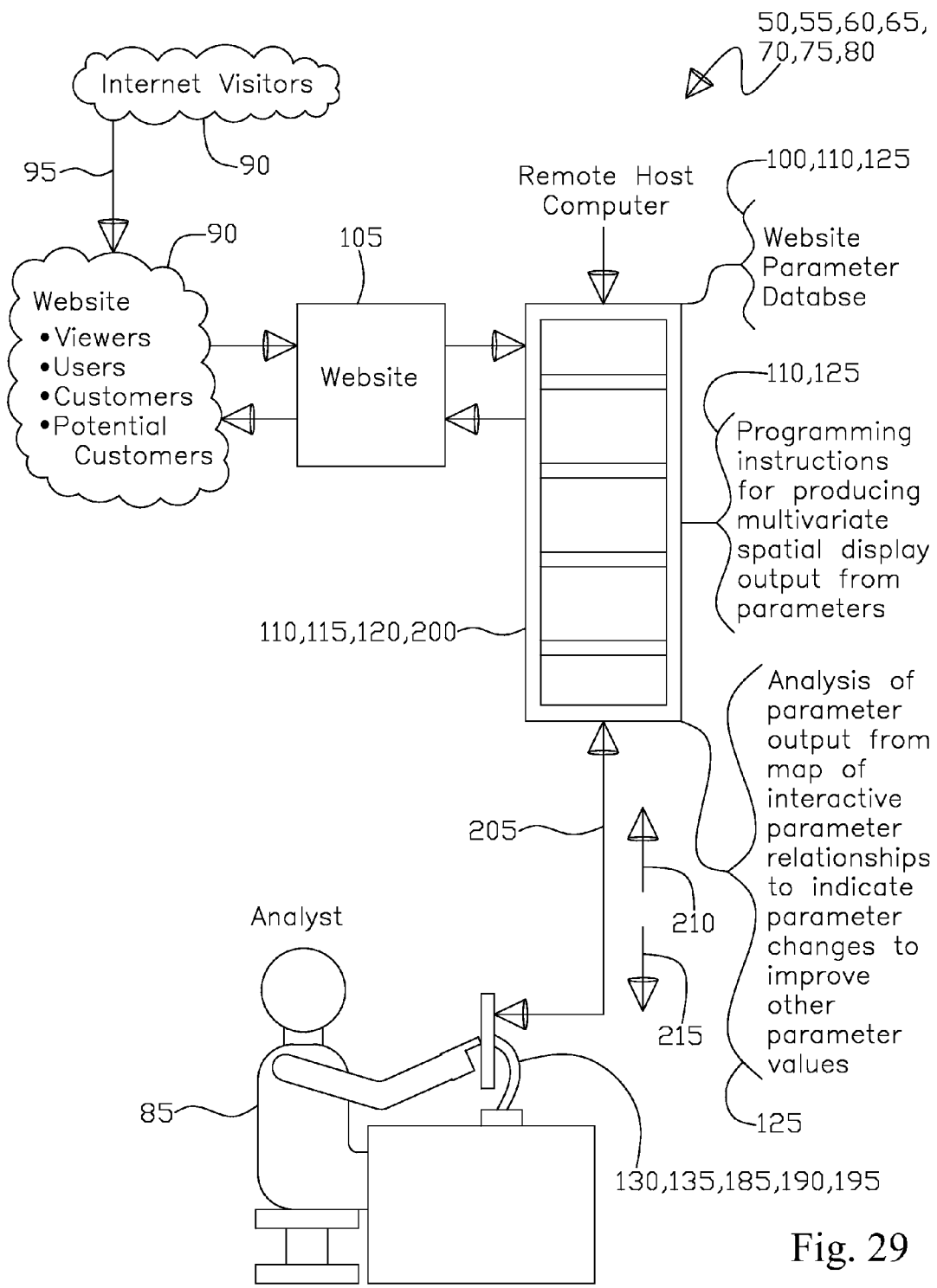
FIG. 29 shows a relationship among the remote host computer acting as a server and the local host computer that has the analyst, further the website is shown and the website visitors, users, viewers, customers, and potential customers.
Figure 30:
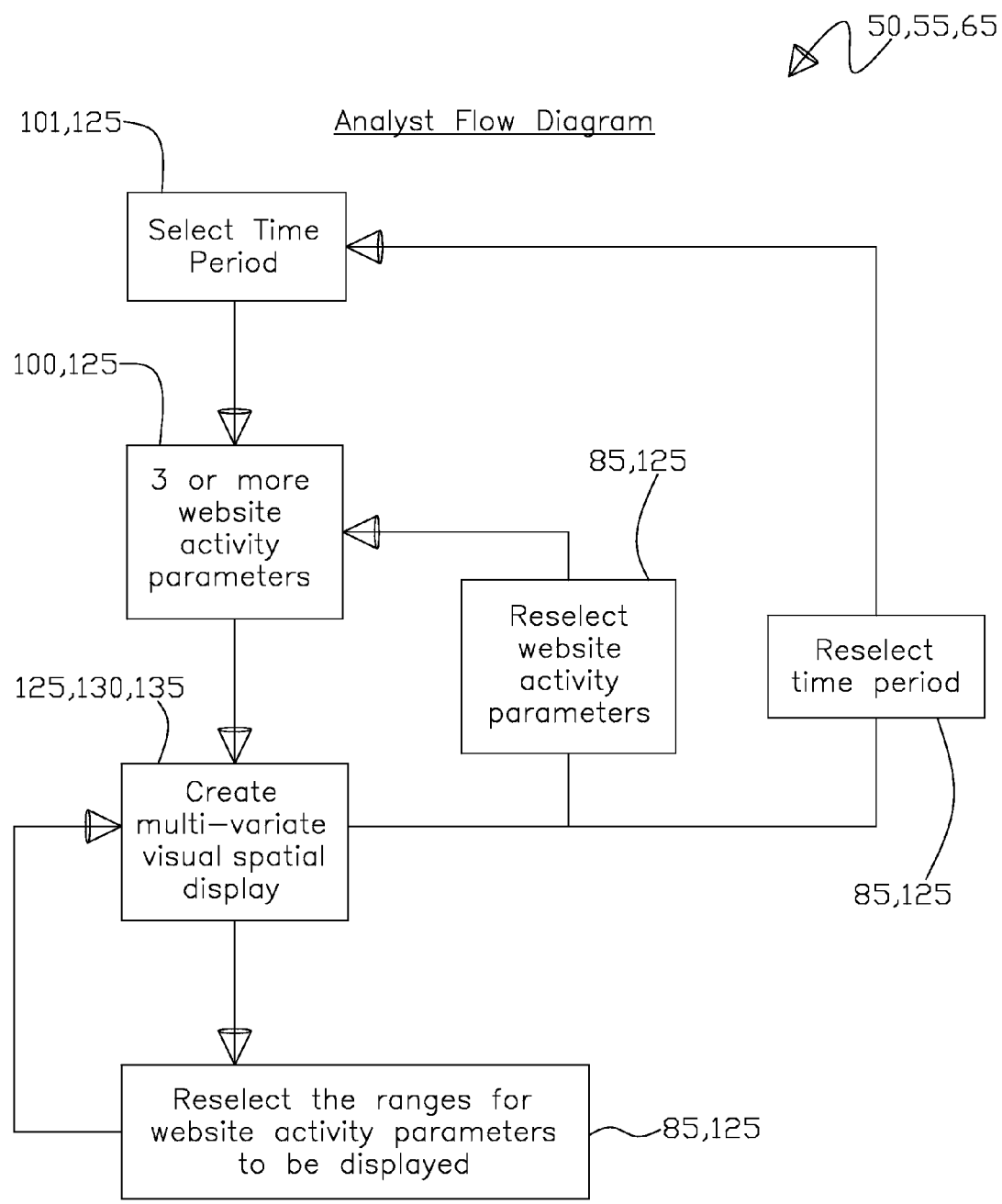
FIG. 30 shows a diagrammatic summary flow chart of the process of using the internet marketing analytics system for the analyst.

Next, FIG. 29 shows the internet marketing analytics system 50, the remote access apparatus 55, method, 60, product 65, and data signal 70 in a relationship among the remote host computer 200 acting as a server and the local host computer 185, 190 that has the business end user or analyst 85, further the business website 105 is shown and the website visitors 90, users viewers, customers, and potential customers. In FIG. 30 shown is a diagrammatic summary flow chart of the process of using the internet marketing analytics system 50, method 60, or product 65 for the business end user or analyst 85.

The internet marketing analytics system 50 is for use by an analyst 85 or anyone else who has an interest in using the analytics system 50 output 130 with the purpose being to quantify a visitor's 90 internet activity level that is of interest to the analyst 85, as generally depicted in FIGS. 28, 29, and 30. The primary building block is the internet activity database 100 that includes a plurality of internet activity parameters being generated by the visitor 90 activity level 95 on the internet that are recorded over a selected time period 101, wherein the parameters could be related or unrelated to the website 105 of interest to the analyst 85, as an example parameters unrelated to the website 105 could be visitors 90 who engage in various social media, GOOGLE searches, related (to the website 105) portal sites, competitor sites and the like, for the database 100 to capture channels of activity by the visitor 90 to the internet that could be indirectly related to but not in direct contact with the website 105 of interest. Further the database 100 would also include all of the parameters directly related to the website 105 for tracking the visitors activity while on the website 105.

The internet marketing analytics system 50 also includes one or more processors 115, memory 120, and one or more programs 125, see FIGS. 28, 29, and 30, wherein the one or more programs 125 are stored in the memory 120 and executed by one or more of the processors 115. The programs 125 include instructions for producing a multi-variate visual spatial display 130, see FIGS. 3 to 5, 7, and 9 to 27, of the internet activity 95 database 100 including at least three of the parameters 100 being simultaneously displayed, again see FIGS. 3 to 5, 7, and 9 to 27, wherein the display 130 transforms at least three 135 of the parameters 100 into a visual tool for identifying an interactive relationship of each of the parameters 100 resulting in a decision to increase or decrease at least one each of the parameters 100 to predictably increase a sales revenue of a website 105.

As an enhancement for the display 130, the program 125 can further comprise instructions for dynamically modifying 145 the display 130 to selectively emphasize one of the parameters via altering a viewing position of an X, Y, or Z axis for visual clarity, see in particular FIGS. 4, 5, 11, 12, 14, 15, 17 to 22, 24, 25, and 27. Wherein the enhancement modification 145 can apply to the internet marketing analytics system 50, the remote access apparatus 55, method, 60, product 65, data signal 70, and memory 80.

Further, as applied to the internet marketing analytics system 50, the remote access apparatus 55, method, 60, product 65, data signal 70, and memory 80, the program 125 can further comprise instructions for mapping dynamic interrelationships as between at least three 135 of the parameters 100 over said time period, wherein a selected parameter 100 has a value changed to a selected hypothetical value and the programs 125 are re-executed using the dynamic interrelationship mapping to produce a multi-variate visual spatial hypothetical display 130 of the selected hypothetical parameter 100 value's effect upon at least two the parameters 100 over the time period 101. Thus resulting in at least three 135 resultant hypothetical parameters 100 being simultaneously displayed in the hypothetical display 130, that includes the selected hypothetical parameter 100 value and at least two resultant hypothetical parameters 100 over the time period 101, as determined from the dynamic interrelationship mapping. Wherein, the hypothetical display 130 transforms at least three of the hypothetical parameters 100 into a hypothetical visual tool for analyzing an interactive relationship of each of the hypothetical parameters 100 resulting in a decision to increase or decrease at least one each of the parameters to predictably increase the website 105 revenue. Thus, the mapping dynamic interrelationships as between the parameters 100 allows for a "what if" type of predictability on various parameter 100 adjustments prior to actually making the parameter 100 changes in the real world.

Further, as applied to the internet marketing analytics system 50, the remote access apparatus 55, method, 60, product 65, data signal 70, and memory 80, wherein the program 125 can further comprise instructions for detecting abnormal groupings 150 of the parameters 100 on the display 130, wherein the abnormal groupings 150 are selected from the group consisting essentially of clusters 155, outliers 160, and gaps 165, for the purpose of bringing the abnormal groupings 150 to the analyst's 85 attention, see for example FIGS. 4, 5, 9, 14 to 16, 20, and 23. This allows the analyst 85 to more quickly focus upon parameters 100 that should get priority attention as having greater influence to potentially raise the website 105 revenue based upon on the programs 125 parameter 100 experience.

In addition, as applied to the internet marketing analytics system 50, the remote access apparatus 55, method, 60, product 65, data signal 70, and memory 80, the program 125 can further comprise instructions for producing a multivariate visual spatial display 130 of the internet activity database 100 including at least eight 140 of the parameters 100 being simultaneously displayed 130, see in particular FIGS. 26 and 27. Wherein the display 130 transforms at least eight 140 of the parameters 100 into a visual tool 130 for identifying an interactive relationship of each of the parameters 100 resulting in a decision to increase or decrease at least one each of the parameters 100 to predictably increase the sales revenue of the website 105. To better differentiate the parameters 100 while using at least three 135 and up to eight 140 or more parameters 100 in a single display 130, the parameters 100 can have a plurality of visually distinguishing features from one another in the multivariate visual spatial display 130, wherein the features are selected from the group consisting essentially of a plurality of different colors 170, a plurality of different text sizes 175, a plurality of different surface textures 176, and a plurality of different geometric feature shapes and sizes 180, as best shown in FIGS. 26 and 27, as the greater number of parameters 100 that can be simultaneously visualized the more comprehensive understanding on the parameter 100 interactive relationships, especially with abnormal groupings 150, and the dynamic interrelationship mapping that can assist the analyst 85 in optimizing the website 105 for increased potential sales revenue.

In addition, as applied to the internet marketing analytics system 50, the remote access apparatus 55, method, 60, product 65, data signal 70, and memory 80, the internet activity database 100 that includes the plurality of internet activity parameters 100 recorded over the selected time period 101 has for the parameters 100 that are associated with the website 105 are selected from the group consisting essentially of number of customer visits, sales revenue, number of customer identified webpage open rates, customer bounce rates, customer exit rate, customer conversion rates, number of customer click throughs, number of customer click through identified categories, number of new customer goods and services orders, number of return customer goods and services orders, number of units per order, number of shopping cart additions, number of shopping cart removals, number of internal searches, number of internal search identified categories, customer average order value, customer sales revenue value per visit, number of identified pages viewed per customer visit, number of customer email signups, number of customer identified webpage impressions per visit, time period of customer website visit, number of return website customers, number of new website customers, number of customer identified referral sources, business cost per customer, total website revenues by business identified categories, and number of new customer visits. Note that this list could have additional entries for the website 105 associated database parameters 100 that are generated by the visitor 90 via their activities on the website 105 or visitor 90 activities 95 forming the resulting parameters 100 on the internet not necessarily associated with the website 105.

Further, for the internet marketing analytics remote access apparatus 55 that is for providing the analyst 85 local analytical and decision making capabilities for a website 105 from a remote program 125, see FIGS. 28 and 29. The internet marketing analytics remote access apparatus 55 includes the local host interface component 185, the remote host server computer 200, and a data communication structure 205 that facilitates a connection between the local host interface component 185 and the remote host server computer 200 allowing data transfer therebetween. Also, the internet marketing analytics remote access apparatus 55 local host interface component 185 further includes the local human perceptible interface device 190 having an input from and an output to the analyst 85, see FIG. 29, the local host interface component 185 also includes the local control module 195 having a data communication construction 210, 215 with the local human perceptible interface device 190 and the remote host server computer 200 for initiating a data interaction from the local human perceptible interface device 190 input 210 to an input 210 of the remote host server computer 200 and an output 215 from the remote host server computer 200 to the local human perceptible interface device 190 output 215. The local host interface component 185 and perceptible interface 190, plus module 195 could be a typical computer or as termed a "dumb" device that is merely an interface for the analyst 85 from the server 200, all as applicable to the internet marketing analytics system 50, the remote access apparatus 55, method, 60, product 65, data signal 70, and memory 80.

Continuing, for the internet marketing analytics remote access apparatus 55, the remote host server computer 200 further includes one or more processors 115, memory 120, and one or more programs 125, wherein the one or more programs 125 are stored in the memory 120 and executed by the one or more processors 115. With the one or more programs 125 including instructions for building an internet activity database 100 including a plurality of internet activity 95 parameters 100 generated by the visitor 90 activity level on the internet that are over the selected time period 101. Further included are instructions for producing a multivariate visual spatial display 130, see FIGS. 3 to 5, 7, and 9 to 27, on the local human perceptible interface device 190 of the internet activity database 100 including at least three 135 of the parameters 100 being simultaneously displayed 130. Wherein the display 130 transforms at least three 135 of the parameters into a visual tool 130 for identifying an interactive relationship of each of the parameters 100 resulting in a decision to increase or decrease at least one each of the parameters to predictably increase the sales revenue of the website 105.

Continuing, the method 60 is disclosed for producing internet marketing analytics directive information to an analyst 85 for the purpose of optimizing the efficiency of the website 105, see FIGS. 28, 29, and 30, the method 60 including the steps of; providing at least one server computer 200 in data communication 205 with a computer network, wherein the server computer 200 includes one or more processors 115 and memory 120. A next step of providing a human perceptible interface device 190 that is in data communication 205 with the computer network, a further step of programming instructions 125 that are stored in the memory 120 and executed by the one or more processors 115 for building an internet activity 95 database 100 including a plurality of internet activity parameters 100 being generated by an internet visitor 90 that are recorded over a selected time period 101. Continuing, a step of programming 125 instructions that are stored in the memory 120 and executed by the one or more processors 115 for producing a multi-variate visual spatial display 130 on the human perceptible interface device 190 of the internet activity database 100 including at least three 135 of the parameters 100 being simultaneously displayed, see FIGS. 3 to 5, 7, and 9 to 27. Wherein the display 130 transforms at least three of the parameters 100 into a visual tool 130 for identifying an interactive relationship of each of the parameters 100 resulting in a decision to increase or decrease at least one each of the parameters 100 to predictably increase the sales revenue of the website 105 to increase the efficiency of the website 105.

Next, for the internet marketing analytics product 65 for use with a computer that provides directive information to an analyst 85 for the purpose of optimizing the efficiency of a website 105, the product 65 includes the computer usable medium 110 having computer readable program code 125 embodied therein that includes programming instructions 125 for building an internet activity 95 database 100 including a plurality of internet visitor 90 activity 95 parameters 100 being generated that are recorded over a selected time period 101, see FIG. 28. Note that the computer readable medium 110 can be any type of memory 120 or fixed medium (disc) that can store program instructions 125. Also included for the internet marketing analytics product 65 are programming instructions 125 for producing a multi-variate visual spatial display 130 of the internet activity database 100 including at least three 135 of the parameters being simultaneously displayed, see FIGS. 3 to 5, 7, and 9 to 27. Wherein the display 130 transforms at least three 135 of the parameters into a visual tool 130 for identifying an interactive relationship of each of the parameters 100 resulting in a decision to increase or decrease at least one each of the parameters to predictably increase the sales revenue of the website 105 to increase the efficiency of the website 105.

Further, an option is disclosed for the internet marketing analytics computer data signal 70 embodied in a carrier wave 75 for use with a computer that provides directive information to the analyst 85 for the purpose of optimizing the efficiency of the website 105, the carrier wave 75 including programming instructions 125 for building an internet activity 95 database 100 including a plurality of internet activity 95 parameters 100 being generated by the visitor 90 activity level on the internet that are recorded over a selected time period 101, see FIG. 29. Also included in the internet marketing analytics computer data signal 70 are programming instructions 125 for producing a multi-variate visual spatial display 130 of the internet activity database 100 including at least three 135 of the parameters 100 being simultaneously displayed, see FIGS. 3 to 5, 7, and 9 to 27. Wherein the display 130 transforms at least three 135 of the parameters into a visual tool for identifying an interactive relationship of each of the parameters 100 resulting in a decision to increase or decrease at least one each of the parameters 100 to predictably increase the sales revenue to increase the efficiency of the website 105.

Continuing, for the internet marketing analytics memory 80 for storing data for access by an application program 125 being executed on a data processing system for use with a computer that provides directive information to an analyst 85 for the purpose of optimizing the efficiency of a website 105, with the memory 80 including a data structure stored in a memory 120, the data structure including programming instructions 125 for building an internet activity 95 database 100 including a plurality of internet activity 95 parameters being generated by the visitor 90 activity level 95 on the internet that are recorded over a selected time period 101, see FIG. 29. Further included in the internet marketing analytics memory 80 are programming instructions 125 for producing a multi-variate visual spatial display 130 of the internet activity database 100 including at least three 135 of the parameters 100 being simultaneously displayed, see FIGS. 3 to 5, 7, and 9 to 27. Wherein the display 130 transforms at least three 135 of the parameters into a visual tool for identifying an interactive relationship of each of the parameters 100 resulting in a decision to increase or decrease at least one each of the parameters 100 to predictably increase the sales revenue to increase the efficiency of the website 105.

Incorporation by Reference to the Specification for the Source Code as Follows:
Source code—concurrently submitted as an ASCII text file;
File name: InternetAnalyticsSC
File size (KB): 27.8
File creation date: Sep. 18, 2009 (original)
File format: WinZip File (.ZIP) (no password required)
File description: Source code for the complete code of the patent application

CONCLUSION

Accordingly, the present invention of an internet marketing analytics system has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A computer implemented system for optimizing efficiency of a website, comprising:
   memory capable of storing internet activity parameters generated by visitor activity level on the website; and
   a processor configured to:
   process the internet activity parameters to generate a multivariate visual spatial display represented as a three dimensional cube concurrently displaying each of at least five dimensions of the internet activity parameters occurring over a selected time period, the three dimensional cube displaying composite data derived from at least two dimensions of the internet activity parameters,
   detect at least one abnormal grouping of the parameters within the multivariate visual spatial display, the abnormal grouping being selected from the group including: clusters, outliers, and gaps, and
   dynamically alter, in response to detecting the at least one abnormal grouping, a viewing position of an X, Y, or Z axis of the three dimensional cube on a display device to bring the at least one abnormal grouping of parameters to the attention of the user,
   optimize product performance efficiency of the website by outputting, based on the at least one abnormal grouping of parameters, an action related to one or more products on the website to manipulate the one or more products on the website.

2. The computer implemented system of claim 1, further comprising an input communicatively coupled with the memory for receiving the internet activity parameters from an internet activity database located on a remote host server.

3. The computer implemented system of claim 1, wherein the internet activity parameters are stored within an internet activity database that is built within the memory.

4. The computer implemented system of claim 1, the processor further configured to manipulate the multivariate visual spatial display through selecting data range, transforming data, zooming, panning, and altering viewing position.

5. The computer implemented system of claim 1, the X, Y, and Z axis of the three dimensional cube each respectively representing a raw data attribute of one dimension of the internet activity parameters.

6. The computer implemented system of claim 1, the X, Y, and Z axis of the three dimensional cube each individually or collectively representing composite data derived from at least two dimensions of the internet activity parameters based on one or more of principal component analysis, partial least square analysis, and factor analysis.

7. The computer implemented system of claim 6, wherein three of the at least five dimensions of the internet parameters and composite data are represented respectively on the X, Y, and Z axis of the three dimensional cube, the other of the at least five dimensions of the internet parameters and composite data are respectively represented by a display characteristic selected from the group including: (a) a plurality of different colors, (b) a plurality of different text sizes, (c) a plurality of different surface textures, and (d) a plurality of different geometric feature shapes.

8. The computer implemented system of claim 1, the processor further configured to, prior to the outputting the action:
   re-process the at least five of the internet activity parameters, using a hypothetical value for a selected one of the at least five of the internet activity parameters, such that the values of the other of the at least five of the internet activity parameters are updated as resultant hypothetical internet activity parameters based upon dynamic interrelationship mapping between the at least five of the internet activity parameters, and
   generate a multivariate visual spatial hypothetical display represented as a three dimensional cube concurrently displaying each of (i) the hypothetical value for the selected one and (ii) the resultant hypothetical internet activity parameters.

9. The computer implemented system of claim 1, the internet parameters representing parameters associated with the website selected from the group including: number of customer visits, sales revenue, number of customer identified webpage open rates, customer bounce rates, customer exit rate, customer conversion rates, number of customer click throughs, number of customer click through identified categories, number of new customer goods and services orders, number of return customer goods and services orders, number of units per order, number of shopping cart additions, number of shopping cart removals, number of internal searches, number of internal search identified categories, customer average order value, customer sales revenue value per visit, number of identified pages viewed per customer visit, number of customer email signups, number of customer identified webpage impressions per visit, time period of customer website visit, number of return website customers, number of new website customers, number of customer identified referral sources, business cost per customer, total website revenues by business identified categories, and number of new customer visits.

10. A computer implemented method for optimizing efficiency of a website, comprising:
   storing, within non-transitory memory, internet activity parameters generated by visitor activity level on the website;
   processing, using a processor, the internet activity parameters to generate a multivariate visual spatial display represented as a three dimensional cube concurrently displaying each of at least five dimensions of the internet activity parameters occurring over a selected time period, the three dimensional cube displaying composite data derived from at least two dimensions of the internet activity parameters;
   detecting at least one abnormal grouping of the displayed parameters within the multivariate visual spatial display, the abnormal grouping selected from the group including: clusters within the displayed parameters, outliers within the displayed parameters, and gaps within the displayed parameters; and
   dynamically altering, in response to detecting the at least one abnormal grouping, a viewing position of an X, Y, or Z axis of the three dimensional cube on a display device to bring the at least one abnormal grouping of parameters dynamically to the attention of the user, and optimize product performance efficiency of the website by outputting, from the processor and based on the at least one abnormal grouping of parameters, an action related to one or more products on the website to manipulate the one or more products on the website.

11. The computer implemented method of claim 10, further comprising receiving, at an input communicatively coupled with the memory, the internet activity parameters from an internet activity database located on a remote host server.

12. The computer implemented method of claim 10, wherein the step of storing further includes building an internet activity database within the non-transitory memory.

13. The computer implemented method of claim 10, further comprising manipulating the multivariate visual spatial display through selecting data range, transforming data, zooming, panning, and altering viewing position.

14. The computer implemented method of claim 10, the step of generating the multivariate visual spatial display comprising displaying the X, Y, and Z axis of the three dimensional cube each respectively representing a raw data attribute of one of the internet activity parameters.

15. The computer implemented method of claim 10, the step of generating the multivariate visual spatial display comprising displaying the X, Y, and Z axis of the three dimensional cube each individually or collectively representing composite data derived from the internet activity parameters based on at least one of principal component analysis, partial least square analysis, and factor analysis.

16. The computer implemented method of claim 10, the step of generating the multivariate visual spatial display comprising:
   displaying three of the internet parameters or composite data respectively on the X, Y, and Z axis of the three dimensional cube, and
   displaying the other of the at least five of the at least five of the internet parameters or composite data are respectively represented by a display characteristic selected from the group including: (a) a plurality of different colors, (b) a plurality of different text sizes, (c) a plurality of different surface textures, and (d) a plurality of different geometric feature shapes.

17. The computer implemented method of claim 10, further comprising, prior to the step of outputting:
   re-processing, via the processor, the at least five of the internet activity parameters, using a hypothetical value for a selected one of the at least five of the internet activity parameters, such that the values of the other of the at least five of the internet activity parameters are updated as resultant hypothetical internet activity parameters based upon dynamic interrelationship mapping between the at least five of the internet activity parameters, and
   generating a multivariate visual spatial hypothetical display represented as a three dimensional cube concurrently displaying each of (i) the hypothetical value for the selected one and (ii) the resultant hypothetical internet activity parameters.

18. The computer implemented method of claim 10, the internet parameters representing parameters associated with the website selected from the group including: number of customer visits, sales revenue, number of customer identified webpage open rates, customer bounce rates, customer exit rate, customer conversion rates, number of customer click throughs, number of customer click through identified categories, number of new customer goods and services orders, number of return customer goods and services orders, number of units per order, number of shopping cart additions, number of shopping cart removals, number of internal searches, number of internal search identified categories, customer average order value, customer sales revenue value per visit, number of identified pages viewed per customer visit, number of customer email signups, number of customer identified webpage impressions per visit, time period of customer website visit, number of return website customers, number of new website customers, number of customer identified referral sources, business cost per customer, total website revenues by business identified categories, and number of new customer visits.

19. The computer implemented system of claim 1, the action being to change the price of the product on the website.

20. The computer implemented system of claim 1, the action being to change position of the product on the website.

21. The computer implemented system of claim 1, the action being to change metadata of the product on the website, the metadata including one or more of product category, on-website search data.

* * * * *